United States Patent
Kato et al.

(10) Patent No.: US 6,400,877 B1
(45) Date of Patent: Jun. 4, 2002

(54) NEGATIVE-DISPERSION OPTICAL FIBER AND OPTICAL TRANSMISSION LINE INCORPORATING THE SAME

(75) Inventors: Takatoshi Kato; Masaaki Hirano, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/879,103

(22) Filed: Jun. 13, 2001

Related U.S. Application Data
(60) Provisional application No. 60/283,168, filed on Apr. 12, 2001.

(30) Foreign Application Priority Data

Sep. 1, 2000 (JP) .......................................... 2000-265736

(51) Int. Cl.$^7$ ................................................. G02B 6/02
(52) U.S. Cl. ...................................................... 385/123
(58) Field of Search ................................ 385/123, 124, 385/125, 126, 127, 128, 100, 115, 103; 362/551

(56) References Cited

U.S. PATENT DOCUMENTS

| | | | |
|---|---|---|---|
| 5,361,319 A | 11/1994 | Antos et al. | |
| 5,568,583 A | 10/1996 | Akasaka et al. | |
| 5,673,354 A | 9/1997 | Akasaka et al. | |
| 5,878,182 A | * 3/1999 | Peckham | 385/123 |
| 6,317,549 B1 | * 11/2001 | Brown | 385/123 |

FOREIGN PATENT DOCUMENTS

| | | |
|---|---|---|
| JP | 06-011620 | 1/1994 |
| JP | 08-136758 | 5/1996 |
| JP | 10-319266 | 12/1998 |
| JP | 2988571 | 10/1999 |
| WO | WO 00/17684 | 3/2000 |
| WO | WO 00/70378 | 11/2000 |

OTHER PUBLICATIONS

Yasushi Koyano, Masashi Onishi, Kenji Tamano, and Masayuki Nishimura, "Compactly–Packaged High Performance Fiber–Based Dispersion Compensation Modules," Sumitomo Electric Industries, Ltd., ECOC'96, Oslo, 22$^{nd}$ European Conference on Optical Communication, Wep.03, pp. 3.221–3.224.

D.W. Hawtof, G.E. Berkey, and A.J. Antos, "High Figure Of Merit Dispersion Compensating Fiber," Corning, Incorporated, Science And Technology Division, SP–DV–1–7, Corning, NY 14831, pp. 1–9.

* cited by examiner

*Primary Examiner*—Robert H. Kim
*Assistant Examiner*—Elizabeth Gemmell
(74) *Attorney, Agent, or Firm*—McDermott, Will & Emery

(57) ABSTRACT

The present invention concerns a negative-dispersion optical fiber for compensating in a shorter length for chromatic dispersion of a positive-dispersion optical fiber in a signal wavelength band, and an optical transmission line incorporating it. The negative-dispersion optical fiber has the following properties at the wavelength of 1550 nm; chromatic dispersion D of not more than −150 ps/nm/km; a dispersion slope satisfying such a condition that a ratio thereof (S/D) to the chromatic dispersion D is not less than $2.0 \times 10^{-3}$/nm nor more than $4.7 \times 10^{31}$ $^3$/nm; and an effective area of not less than 12 $\mu m^2$ but less than 25 $\mu m^2$. For satisfying these properties, the negative-dispersion optical fiber has, in the order stated from the center toward the outer periphery, a core region of a maximum refractive index $n_1$, a first cladding of a refractive index $n_2$ ($<n_1$), a second cladding of a refractive index $n_3$ ($>n_2$), and a third cladding of a refractive index $n_4$ ($<n_3$).

26 Claims, 15 Drawing Sheets

Fig. 6

| | FIBER A | FIBER B | FIBER C | FIBER D | FIBER E | FIBER F | FIBER G |
|---|---|---|---|---|---|---|---|
| $\Delta_1$ (%) | 2.4 | 2.4 | 2.7 | 2.7 | 2.7 | 2.7 | 2.1 |
| $\Delta_2$ (%) | -0.5 | -0.5 | -0.5 | -0.5 | -0.5 | -0.5 | -0.5 |
| $\Delta_3$ (%) | 0.2 | 0.2 | 0.3 | 0.3 | 0.3 | 0.3 | 0.2 |
| Ra | 0.20 | 0.20 | 0.20 | 0.20 | 0.20 | 0.20 | 0.20 |
| Rb | 0.52 | 0.48 | 0.46 | 0.50 | 0.54 | 0.54 | 0.50 |
| 2c ($\mu$m) | 15.4 | 15.6 | 15.2 | 15.0 | 14.8 | 14.6 | 17.0 |
| CHROMATIC DISPERSION D (ps/nm/km) | -200 | -185 | -182 | -189 | -194 | -216 | -206 |
| DISPERSION SLOPE S (ps/nm²/km) | -0.69 | -0.43 | -0.39 | -0.58 | -0.78 | -0.65 | -0.68 |
| $S_2/D_2$ (/nm) | $3.5 \times 10^{-3}$ | $2.3 \times 10^{-3}$ | $2.1 \times 10^{-3}$ | $3.1 \times 10^{-3}$ | $4.0 \times 10^{-3}$ | $3.0 \times 10^{-3}$ | $3.3 \times 10^{-3}$ |
| EFFECTIVE AREA ($\mu$m²) | 17.5 | 17.7 | 14.8 | 14.4 | 14.1 | 15.5 | 21.3 |
| BEND LOSS IN DIAMETER OF 20mm (dB/m) | 4 | 1 | 0.001 | 0.01 | 0.06 | 0.2 | 9.7 |
| TRANSMISSION LOSS (dB/km) | 0.52 | 0.51 | 0.65 | 0.66 | 0.67 | 0.67 | 0.49 |
| CUTOFF WAVELENGTH ($\mu$m) | 1.22 | 1.30 | 1.70 | 1.61 | 1.51 | 1.49 | 1.37 |

Fig.13

| | FIBER A | FIBER B | FIBER C | FIBER D | FIBER E | FIBER F | FIBER G |
|---|---|---|---|---|---|---|---|
| LENGTH OF SPLICES FIBER (km) | 7.4 | 7.6 | 7.6 | 7.5 | 7.4 | 6.6 | 7.0 |
| INSERTION LOSS (dB) | 4.8 | 4.9 | 5.9 | 6.0 | 6.0 | 5.4 | 4.4 |
| DEVIATIONS OF AVERAGE CHROMATIC DISPERSION AMONG WAVELENGTH (ps/nm/km) 1530nm~1560nm | 0.35 | 0.32 | 0.49 | 0.04 | 0.48 | 0.10 | 0.43 |
| 1450nm~1560nm | 0.94 | 0.80 | 1.51 | 0.44 | 0.88 | 0.41 | 1.88 |
| 1450nm~1610nm | 1.62 | 3.18 | 3.64 | 1.72 | 1.02 | 2.10 | 3.13 |

NEGATIVE-DISPERSION OPTICAL FIBER AND OPTICAL TRANSMISSION LINE INCORPORATING THE SAME

CROSS-REFERENCE TO RELATED APPLICATION

This application claims priority to Provisional Application Ser. No. 60/283,168 filed on Apr. 12, 2001, which is/are hereby incorporated by reference in its/their entirety.

BACKGROUND OF THE INVENTION

1. Field of the Invention

The present invention relates to a negative-dispersion optical fiber for compensating for chromatic dispersion of a positive-dispersion optical fiber having positive chromatic dispersion in a signal wavelength band, and to an optical transmission line incorporating the same.

2. Related Background Art

An optical transmission system transmits signals of multiple channels through an optical transmission line consisting of optical fibers to enable long-haul and large-capacity communication. Silica based optical fibers commonly applied to the optical transmission lines exhibit their minimum transmission loss near the wavelength of 1.55 $\mu$m. On the other hand, an Er-doped optical fiber amplifier (EDFA: Erbium-Doped Fiber Amplifier) capable of amplifying signals near the wavelength of 1.55 $\mu$m is available for practical use as optical amplification means. For this reason, C-band (1530 nm to 1560 nm) is mainly utilized as a signal wavelength band.

Since EDFA capable of amplifying signals near the wavelength of 1.58 $\mu$m was also developed recently, L-band (1570 nm to 1610 nm) is also now being utilized as a signal wavelength band. For realizing much larger capacity transmission, use of S-band (1450 nm to 1530 nm) as a signal wavelength band is also under research.

In addition, wavelength division multiplexing (WDM) optical transmission systems are systems that transmit multiplexed signals of multiple channels included in the foregoing S-band, C-band, or L-band and that enable large-capacity information transmission. Concerning such WDM optical transmission systems, there are needs for further increase of information content and this demands to maintain absolute values of chromatic dispersion small across a wider wavelength band throughout the entire optical transmission line.

However, the optical fibers normally applied to the optical transmission lines have positive chromatic dispersion and the positive sign of dispersion slope in either of the S-band, C-band, and L-band. For example, a standard single-mode optical fiber having the zero dispersion wavelength near the wavelength of 1.3 $\mu$m has the chromatic dispersion of about +16 ps/nm/km to +21 ps/nm/km at the wavelength of 1.55 $\mu$m. A non-zero dispersion-shifted optical fiber (NZ-DSF) having the zero dispersion wavelength near the wavelength of 1.55 $\mu$m has the chromatic dispersion of about +2 ps/nm/km to +12 ps/nm/km at the wavelength of 1.55 $\mu$m. These single-mode optical fiber and non-zero dispersion-shifted optical fiber both have positive dispersion slopes in the S-band, C-band, and L-band.

When an optical transmission line is constructed by applying only optical fibers with positive chromatic dispersion (hereinafter referred to as positive-dispersion optical fibers) as described above, the optical transmission line has large cumulative chromatic dispersion. This leads to degradation of waveforms of signals and it thus becomes hard to implement long-haul and large-capacity optical transmission. Therefore, application of optical fibers with negative chromatic dispersion (hereinafter referred to as negative-dispersion optical fibers) is under study in order to compensate for the chromatic dispersion of the positive-dispersion optical fibers (e.g., Japanese Patent Applications Laid-Open No. H6-11620, H8-136758, H8-313750, and so on).

SUMMARY OF THE INVENTION

The inventors investigated the above-mentioned prior arts and found the following problem. Namely, it is generally known that the negative-dispersion optical fibers have larger transmission losses than the positive-dispersion optical fibers. Therefore, in the case of using long negative-dispersion optical fibers, there is a problem such that the transmission loss becomes large. According to the knowledge of the inventors, the optical transmission line composed of the positive-dispersion and negative-dispersion optical fibers has such a tendency that average chromatic dispersion on the whole of the optical transmission line is 0 near the zero dispersion wavelength but absolute values of chromatic dispersion increase with deviation from the zero dispersion wavelength. Since the conventional transmission lines had the large deviation of chromatic dispersion in the signal wavelength band as described, there was a limit to implementation of long-haul and large-capacity WDM optical transmission.

The present invention has been accomplished in order to solve the foregoing problem and an object of the invention is to provide a negative-dispersion optical fiber that can compensate in a short length for the chromatic dispersion of the positive-dispersion optical fiber in the signal wavelength band, and an optical transmission line incorporating it and enabling long-haul and large-capacity WDM optical transmission.

In order to accomplish the above object, a negative-dispersion optical fiber according to the present invention has the following properties at the wavelength of 1550 nm: chromatic dispersion D of not more than −150 ps/nm/km and more preferably not more than −180 ps/nm/km; a dispersion slope S satisfying such a condition that a ratio thereof to the chromatic dispersion D, (S/D), is not less than $2.0 \times 10^{-3}$/nm nor more than $4.7 \times 10^{-3}$/nm; and an effective area of not less than 12 $\mu$m$^2$ but less than 25 $\mu$m$^2$ and more preferably less than 20 $\mu$m$^2$. Another negative-dispersion optical fiber according to the present invention may have the following properties at the wavelength of 1550 nm: chromatic dispersion D of not more than −200 ps/nm/km; and a dispersion slope S satisfying such a condition that a ratio thereof to the chromatic dispersion D, (S/D), is not less than $2.0 \times 10^{-3}$/nm nor more than $4.7 \times 10^{-3}$/nm.

Since the negative-dispersion optical fiber has the small chromatic dispersion D (the sign of which is negative and the absolute value of which is large) as described above, an optical transmission line composed of a positive-dispersion optical fiber and the negative-dispersion optical fiber can be constructed at a small ratio of the length of the negative-dispersion optical fiber. This suppresses increase of transmission loss due to insertion of the negative-dispersion optical fiber in the optical transmission line and enables construction of the optical transmission line at low cost. Since the foregoing ratio (S/D) is not less than $2.0 \times 10^{-3}$/nm nor more than $4.7 \times 10^{-3}$/nm, a dispersion slope compensation rate becomes approximately 60% to 140%, whereby it is feasible to make small both respective absolute values of average chromatic dispersion and average dispersion slope on the whole of the optical transmission line and make small the deviation (maximum–minimum) of average chromatic dispersion among wavelengths on the whole of the optical transmission line in the signal wavelength band. The effective area of not less than 12 $\mu m^2$ is equivalent to or larger than those of the conventional negative-dispersion optical fibers and can effectively restrain the nonlinear optical phenomena. The effective area of less than 25 $\mu m^2$ and more preferably less than 20 $\mu m^2$ can effectively restrain increase of loss in the negative-dispersion optical fiber even in a cabled form as a bundle of optical fibers or in a modularized form as wound in coil shape.

The effective area $A_{eff}$ is given by the following equation, as described in Japanese Patent Application Laid-Open No. H8-248251 (EP 0 724171A2).

$$A_{eff} = 2\pi \left( \int_0^\infty E^2 r\, dr \right)^2 \Big/ \left( \int_0^\infty E^4 r\, dr \right)$$

In this equation, E represents an electric field caused by propagating light and r a radial distance from the center of the core.

In the negative-dispersion optical fiber according to the present invention, the ratio (S/D) of the dispersion slope S to the chromatic dispersion D is not less than $2.7\times10^{-3}$/nm nor more than $4.0\times10^{-3}$/nm. In this case, the dispersion slope compensation rate becomes approximately 80% to 120%, which makes small both the respective absolute values of average chromatic dispersion and average dispersion slope on the whole of the optical transmission line incorporating the negative-dispersion optical fiber and which also makes smaller the deviation of average chromatic dispersion among wavelengths on the whole of the optical transmission line in the signal wavelength band.

In the negative-dispersion optical fiber according to the present invention, the cutoff wavelength at the length of 2 m (CCITT Standard) is preferably not less than 1.0 $\mu m$ nor more than 2.0 $\mu m$. In this case, the bend loss of the negative-dispersion optical fiber can be controlled to a small level.

In the negative-dispersion optical fiber according to the present invention, a transmission loss at the wavelength of 1550 nm is preferably not more than 1.0 dB/km and more preferably not more than 0.7 dB/km. The reason is that increase of the transmission loss on the whole of the optical transmission line can be suppressed more effectively.

For realizing the various properties as described above, the negative-dispersion optical fiber according to the present invention comprises a core region extending along a predetermined axis and having a predetermined maximum refractive index; a first cladding region surrounding the core region and having a refractive index lower than the maximum refractive index of the core region; a second cladding region surrounding the first cladding region and having a refractive index higher than the refractive index of the first cladding region; and a third cladding region surrounding the second cladding region and having a refractive index lower than the refractive index of the second cladding region.

Having this index profile, the negative-dispersion optical fiber is realized with the foregoing various properties and is preferable, particularly, in that the bend loss can be effectively decreased while lengthening the cutoff wavelength. In the negative-dispersion optical fiber, a maximum relative refractive index difference of the core region to the third cladding region is preferably not less than 1.8% nor more than 3.0%. In this case, the bend loss can be decreased readily by lengthening the cutoff wavelength.

An optical transmission line according to the present invention comprises a negative-dispersion optical fiber having the above-mentioned structure and a positive-dispersion optical fiber having the following properties at the wavelength of 1550 nm: chromatic dispersion of not less than +15 ps/nm/km nor more than +21 ps/nm/km; and a dispersion slope of not less than +0.05 $ps/nm^2$/km nor more than +0.07 $ps/nm^2$/km. This optical transmission line is constructed to compensate for the chromatic dispersion of the positive-dispersion optical fiber by the negative-dispersion optical fiber having the chromatic dispersion and dispersion slope both being small (the negative sign and large absolute values) in the signal wavelength band. This structure can decrease the ratio of the length of the negative-dispersion optical fiber in the entire transmission line and can effectively suppress the increase of transmission loss in the entire transmission line eventually. Since the chromatic dispersion and dispersion slope both are compensated in the optical transmission line by the application of the negative-dispersion optical fiber having the various properties as described above, absolute values of chromatic dispersion can be kept small throughout the entire signal wavelength band and it becomes feasible to implement the long-haul and large-capacity WDM optical transmission.

The optical transmission line according to the present invention comprises the negative-dispersion optical fiber (the negative-dispersion optical fiber according to the present invention) and the positive-dispersion optical fiber as described above and is located at least either between a transmitting station and a receiving station, between a transmitting station and a relay station including an optical amplifier or the like, between relay stations, or between a relay station and a receiving station. The negative-dispersion optical fiber incorporated in the optical transmission line may be located in a relay station. Each of the negative-dispersion optical fiber and the positive-dispersion optical fiber constituting the optical transmission line may be constructed of a plurality of optical fibers fusion-spliced to each other.

Further, in the optical transmission line according to the present invention, the deviation of average chromatic dispersion among wavelengths on the whole of the optical transmission line in the wavelength band of 1530 nm to 1560 nm is not more than 0.5 ps/nm/km, the deviation of average chromatic dispersion among wavelengths on the whole of the optical transmission line in the wavelength band of 1450 nm to 1560 nm is not more than 2.0 ps/nm/km, and the deviation of average chromatic dispersion among wavelengths on the whole of the optical transmission line in the wavelength band of 1450 nm to 1610 nm is not more than 4.0 ps/nm/km and more preferably not more than 2.0 ps/nm/km.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a table showing specifications of samples (fibers A to G) corresponding to the embodiments of the negative-dispersion optical fibers according to the present invention;

FIG. 13 is a table presenting various properties of the respective transmission lines to which the fibers A to G presented in the table of FIG. 6 are applied;

DESCRIPTION OF THE PREFERRED EMBODIMENTS

Each of embodiments of negative-dispersion optical fibers according to the present invention and optical transmission lines incorporating them will be described below referring to FIGS. 1A to 2B and 3 to 15. The same elements will be denoted by the same reference symbols in the description of the drawings and redundant description will be omitted.

Figure 1A:
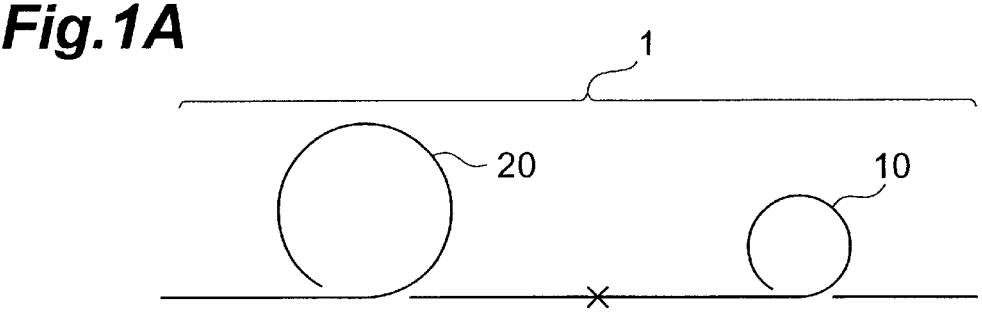
FIGS. 1A to 1D are views for explaining specific configurations of an optical transmission line according to the present invention.

FIG. 1A is a view showing the structure of an optical transmission line 1 according to the present invention. This optical transmission line 1 is provided with a positive-dispersion optical fiber 20 having positive chromatic dispersion at the wavelength of 1550 nm and a negative-dispersion optical fiber 10 having negative chromatic dispersion at the wavelength of 1550 nm (a negative-dispersion optical fiber according to the present invention). In general, the negative-dispersion optical fiber 10 has a smaller effective area than the positive-dispersion optical fiber 20. Accordingly, it is preferable that signals be made to propagate through the negative-dispersion optical fiber 10 after having propagated through the positive-dispersion optical fiber 20, in order to suppress occurrence of the nonlinear optical phenomena.

Figure 1B:
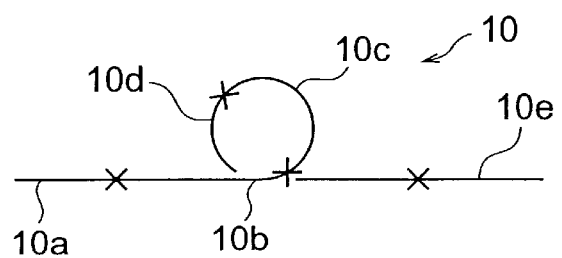
Figure 1C:
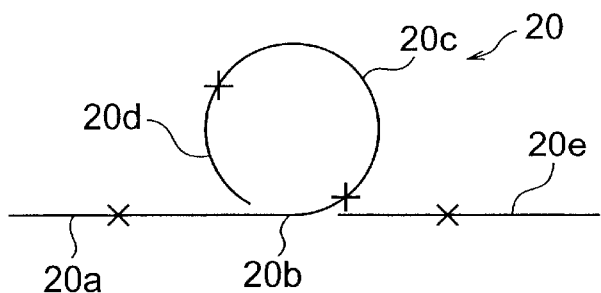
Figure 1D:
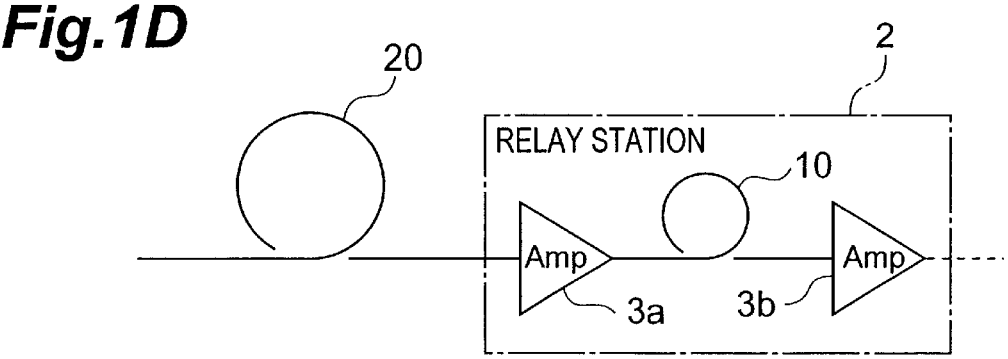

The negative-dispersion optical fiber 10 making the optical transmission line 1 may be composed of a plurality of optical fibers 10a to 10e (having respective optical characteristics substantially identical with each other) fusion-spliced to each other, as shown in FIG. 1B. The positive-dispersion optical fiber 20 may also be composed of a plurality of optical fibers 20a to 20e (having respective optical characteristics substantially identical with each other) fusion-spliced to each other, as shown in FIG. 1C. Further, the optical transmission line 1 is an optical fiber transmission line located at least either between a transmitting station for sending signals of multiple channels and a receiving station, between the transmitting station and a relay station, between relay stations, or between the relay station and the receiving station. The negative-dispersion optical fiber 10 incorporated in the optical transmission line 1 may be housed in a relay station 2, as shown in FIG. 1D. In this case, the negative-dispersion optical fiber 10 may be located between multistage amplifiers 3a, 3b.

The positive-dispersion optical fiber 20 is normally a single-mode optical fiber laid between relay stations and having the zero dispersion wavelength near the wavelength of 1.3 $\mu$m. Namely, this positive-dispersion optical fiber 20 has the chromatic dispersion $D_1$ of not less than +15 ps/nm/km nor more than +21 ps/nm/km at the wavelength of 1.55 $\mu$m and the dispersion slope $S_1$ of not less than +0.05 ps/nm$^2$/km nor more than +0.07 ps/nm$^2$/km.

The negative-dispersion optical fiber 10 may be laid in a relay section while being fusion-spliced to the positive-dispersion optical fiber 20, or may be modularized as wound in coil shape and laid in a relay station or in a receiving station (see FIG. 1D). When the negative-dispersion optical fiber 10 is laid together with the positive-dispersion optical fiber 20 between relay stations, the cumulative transmission loss becomes small, which is preferable. The positive-dispersion optical fiber 20 and the negative-dispersion optical fiber 10 are preferably spliced to each other by fusion splicing. In this case, the mode field diameters of these fibers increase because of heat during the fusion splicing work and thus the splice loss is kept small.

The negative-dispersion optical fiber 10 has the following properties at the wavelength of 1550 nm: the chromatic dispersion $D_2$ of not more than −150 ps/nm/km and more preferably not more than −180 ps/nm/km; the dispersion slope $S_2$ satisfying such a condition that the ratio $(S_2/D_2)$ thereof to the chromatic dispersion $D_2$ is not less than 2.0×10$^{-3}$/nm nor more than 4.7×10$^{-3}$/nm; and the effective area of not less than 12 $\mu$m$^2$ but less than 25 $\mu$m$^2$. As another example, the negative-dispersion optical fiber 10 has the following properties at the wavelength of 1550 nm: the chromatic dispersion $D_2$ of not more than −200 ps/nm/km; and the dispersion slope $S_2$ satisfying such a condition that the ratio $(S_2/D_2)$ thereof to the chromatic dispersion $D_2$ is not less than 2.0×10$^{-3}$/nm nor more than 4.7×10$^{-3}$/nm.

The smaller the chromatic dispersion $D_2$ (the larger the absolute value thereof in the negative sign), the smaller the ratio of the length of the negative-dispersion optical fiber 10 in the optical transmission line 1. Therefore, the smaller chromatic dispersion is preferable, because it becomes feasible to implement decrease of cost per fabrication of optical transmission line 1 and decrease the transmission loss on the whole of the optical transmission line 1. When the ratio ($S_2/D_2$) is not less than $2.0 \times 10^{-3}$/nm nor more than $4.7 \times 10^{-3}$/nm, the dispersion slope compensation rate $\eta$ becomes approximately 60% to 140%. More preferably, the ratio ($S_2/D_2$) is not less than $2.7 \times 10^{-3}$/nm nor more than $4.0 \times 10^{-3}$/nm, whereupon the dispersion slope compensation rate $\eta$ becomes approximately 80% to 120%. The dispersion slope compensation rate $\eta$ (%) is defined by the following equation (1).

$$\eta = 100 \times (S_2/D_2)/(S_1/D_1) \quad (1)$$

Namely, as the dispersion slope compensation rate $\eta$ becomes closer to 100%, the respective absolute values of the average chromatic dispersion and average dispersion slope on the whole of the optical transmission line 1 both become smaller and the deviation (maximum−minimum) of average chromatic dispersion among wavelengths on the whole of the optical transmission line 1 in the signal wavelength band also becomes smaller.

The negative-dispersion optical fiber 10 becomes more resistant to bending with decrease in the effective area. When the effective area is less than 25 $\mu$m$^2$, the transmission loss is small even in the cable form as a bundle of a plurality of optical fibers having the properties equivalent to those of the negative-dispersion optical fiber 10 or in the module form wound in coil shape. When the effective area is not less than 12 $\mu$m$^2$, it is equivalent to or greater than the effective areas of the conventional optical fibers and is sufficient to effectively suppress occurrence of the nonlinear optical phenomena in the negative-dispersion optical fiber 10.

In the negative-dispersion optical fiber 10, the cutoff wavelength at the length of 2 m is preferably not less than 1.0 $\mu$m nor more than 2.0 $\mu$m. When the cutoff wavelength is set in this range, the bend loss becomes small. Even if the cutoff wavelength is longer than the signal light wavelength but when not more than 2.0 $\mu$m, the effective cutoff wavelength becomes shorter because of distance dependence of cutoff wavelength or because of loss of higher modes in the module form as wound in coil shape and the single mode is ensured at the signal wavelengths in the negative-dispersion optical fiber 10. Further, in the negative-dispersion optical fiber 10 the transmission loss at the wavelength of 1550 nm is not more than 1.0 dB/km and preferably not more than 0.7 dB/km, whereby the transmission loss on the whole of the optical transmission line 1 becomes small.

This optical transmission line 1 utilizes the negative-dispersion optical fiber 10 having the chromatic dispersion and dispersion slope both being small (the negative sign and large absolute values) in the signal wavelength band, thereby compensating for the chromatic dispersion of the positive-dispersion optical fiber 20. The ratio of the length of the negative-dispersion optical fiber 10 is decreased in the entire transmission line 1, thereby keeping the transmission loss small on the whole of the optical transmission line 1. Since the chromatic dispersion and dispersion slope both are compensated in this optical transmission line 1, absolute values of chromatic dispersion can be kept small throughout the entire signal wavelength band, which is preferable in terms of implementation of the long-haul and large-capacity WDM optical transmission.

Especially, the optical transmission line 1 yields good transmission characteristics, because the deviation of chromatic dispersion is small in the S-band (1450 nm to 1530 nm), in the C-band (1530 nm to 1560 nm), or in the L-band (1570 nm to 1610 nm). Specifically, in the wavelength band of 1530 nm to 1560 nm, the deviation of average chromatic dispersion among wavelengths on the whole of the optical transmission line 1 is preferably not more than 0.5 ps/nm/km. In the wavelength band of 1450 nm to 1560 nm, the deviation of average chromatic dispersion among wavelengths on the whole of the optical transmission line 1 is preferably not more than 2.0 ps/nm/km. In the wavelength band of 1450 nm to 1610 nm, the deviation of average chromatic dispersion among wavelengths on the whole of the optical transmission line 1 is preferably not more than 4.0 ps/nm/km and more preferably not more than 2.0 ps/nm/km.

Figure 2A:
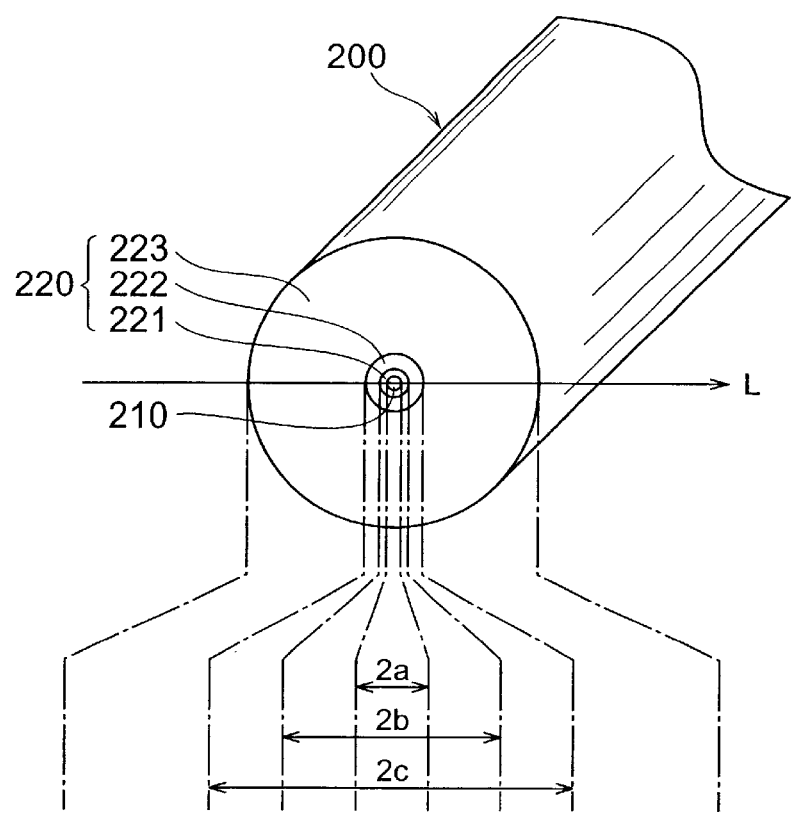
FIGS. 2A and 2B are a view showing a cross-sectional structure of a negative-dispersion optical fiber according to the present invention and an index profile thereof.

FIG. 2A is a view showing the cross-sectional structure of an embodiment of the negative-dispersion optical fiber according to the present invention. This negative-dispersion optical fiber 200 has a core region 210 extending along a predetermined axis and a cladding region 220 provided on the outer periphery of the core region. The cladding region 220 consists of a first cladding region 221 provided on the outer periphery of the core region 210, a second cladding region 222 provided on the outer periphery of the first cladding region 221, and a third cladding region 223 provided on the outer periphery of the second cladding region 222. The core region 210 has a maximum refractive index $n_1$ and an outside diameter 2$a$. The first cladding region 221 has a refractive index $n_2$ ($<n_1$) and an outside diameter 2$b$. The second cladding region 222 has a refractive index $n_3$ ($>n_2$) and an outside diameter 2$c$. The third cladding region 223 has a refractive index $n_4$ ($<n_3$) and an outside diameter of 125 $\mu$m.

This negative-dispersion optical fiber 200 is made by using silica based glass as a principal material and, for example, by doping the core region 210 and the second cladding region 222 with respectively appropriate amounts of $GeO_2$ and doping the first cladding region 221 with an appropriate amount of element F. Relative to the refractive index $n_4$ of the third cladding region 223 as a reference, the relative refractive index difference of the core region 210 is given by $\Delta_1 (=(n_1-n_4)/n_4)$, the relative refractive index difference of the first cladding region 221 by $\Delta_2 (=(n_2-n_4)/n_4)$, and the relative refractive index difference of the second cladding region by $\Delta_3 (=(n_3-n_4)/n_4)$ (the relative refractive index differences in this specification being indicated in percentage).

Figure 2B:
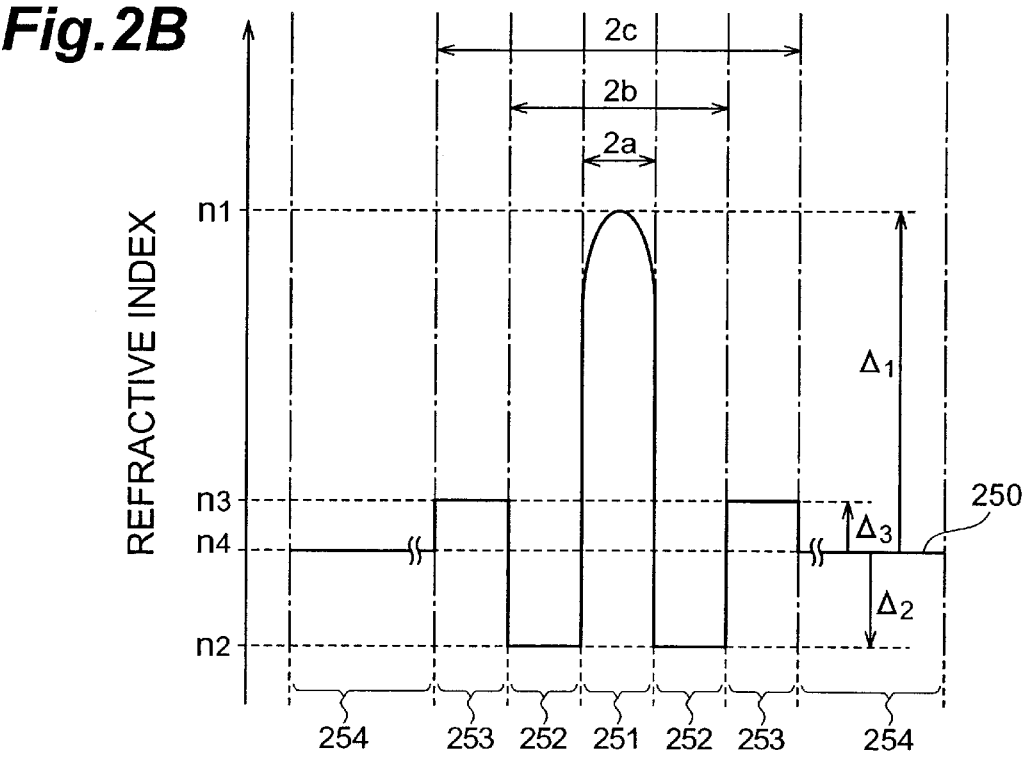

FIG. 2B depicts an index profile 250 of the negative-dispersion optical fiber 200 having the structure as described above. This index profile 250 shows refractive indices along a line L (see FIG. 2A) passing the optical axis, of the respective portions in the negative-dispersion optical fiber 200. Accordingly, in the index profile 250, a region 251 indicates the refractive indices of respective portions on the line L in the core region 210, a region 252 those on the line L in the first cladding region 221, a region 253 those on the line L in the second cladding region 222, and a region 254 those on the line L in the third cladding region 223.

The negative-dispersion optical fiber 10 according to the present invention has the structure similar to that of the negative-dispersion optical fiber 200 shown in FIG. 2A, and has the index profile similar to the index profile 250 shown in FIG. 2B, thereby realizing the aforementioned properties. Particularly, the negative-dispersion optical fiber 10 having the index profile as shown in FIG. 2B can lengthen the cutoff wavelength to reduce the bend loss, as compared with a negative-dispersion optical fiber with an index profile of a comparative example described later (see FIG. 14). The relative refractive index difference $\Delta_1$ of the core region 210 relative to the third cladding region 223 is preferably not less than 1.8% nor more than 3.0% in terms of lengthening the cutoff wavelength to reduce the bend loss.

Specific embodiments of the negative-dispersion optical fiber 10 according to the present invention will be described below. Each of the embodiments described below has the cross-sectional structure shown in FIG. 2A and the index profile shown in FIG. 2B. In the description below, Ra represents a ratio of the outside diameters of the core region 210 and the second cladding region 222 and Rb a ratio of the outside diameters of the first cladding region 221 and the second cladding region 222. Namely, the outside diameter ratios Ra, Rb are expressed by the following equations (2A), (2B), respectively.

$$Ra = a/c \qquad (2A)$$

$$Rb = b/c \qquad (2B)$$

Figure 3:
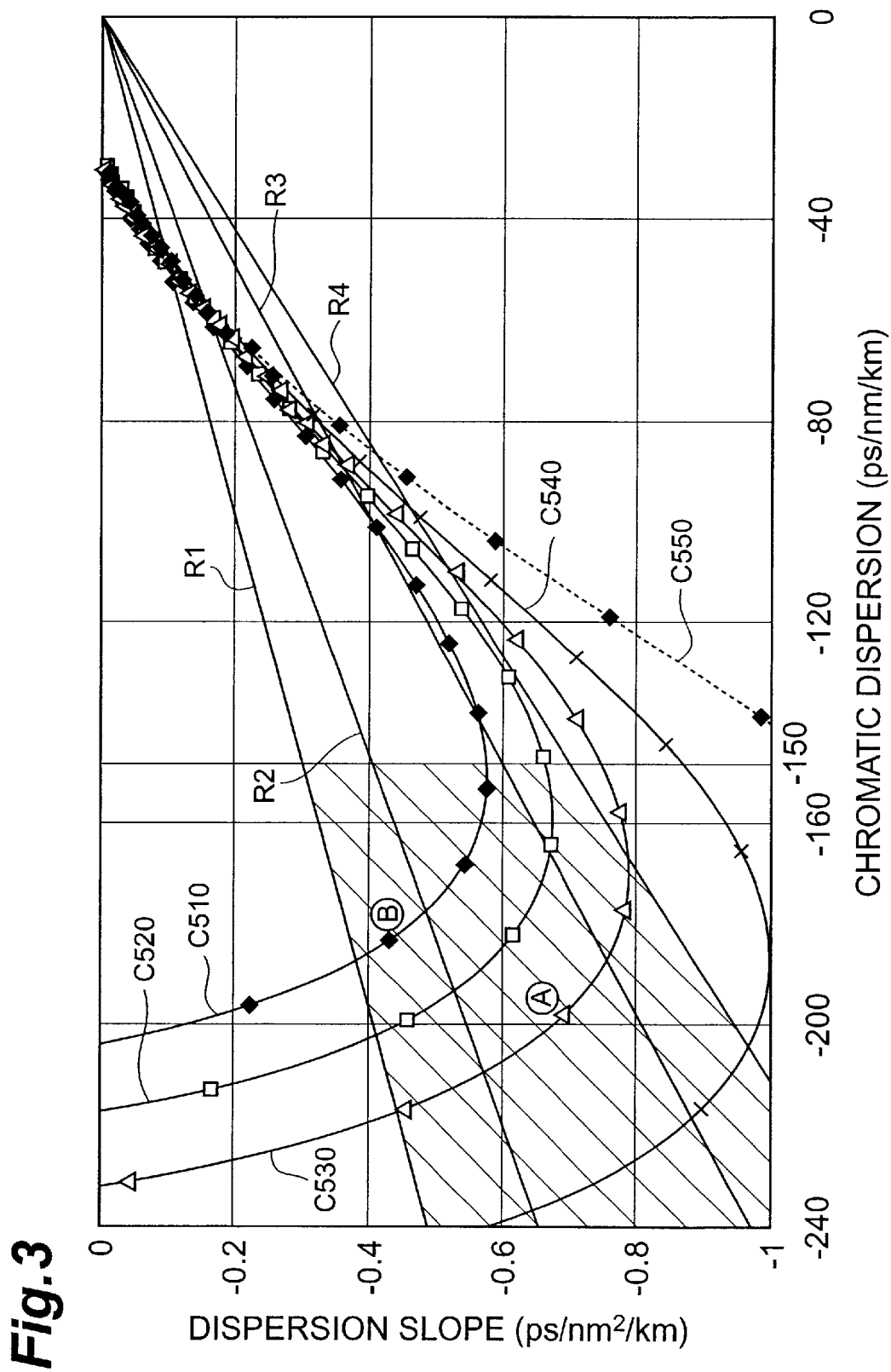
FIGS. 3 to 5 are graphs showing the relation between chromatic dispersion and dispersion slope, for each of embodiments of negative-dispersion optical fibers according to the present invention.

FIG. 3 is a graph showing the relation between chromatic dispersion and dispersion slope, for each of embodiments of negative-dispersion optical fibers according to the present invention. In each of the embodiments shown in this graph, relative to the third cladding region 223, the relative refractive index difference $\Delta_1$ of the core region 210 is set to 2.4%, the relative refractive index difference $\Delta_2$ of the first cladding region to −0.5%, and the relative refractive index difference $\Delta_3$ of the second cladding region to 0.2%, respectively.

For each of an embodiment of Ra=0.20 and Rb=0.48, an embodiment of Ra=0.20 and Rb=0.50, an embodiment of Ra=0.20 and Rb=0.52, an embodiment of Ra=0.20 and Rb=0.55, and an embodiment of Ra=0.20 and Rb=0.60, the inventors obtained respective values of the chromatic dispersion $D_2$ and the dispersion slope $S_2$ of each embodiment at the wavelength of 1550 nm with variation in the outside diameter 2c of the second cladding region. In FIG. 3, a curve C510 indicates the relation between chromatic dispersion and dispersion slope of the embodiment of Ra=0.20 and Rb=0.48, a curve C520 that of the embodiment of Ra=0.20 and Rb=0.50, a curve C530 that of the embodiment of Ra=0.20 and Rb=0.52, a curve C540 that of the embodiment of Ra=0.20 and Rb=0.55, and a curve C550 that of the embodiment of Ra=0.20 and Rb=0.60. In FIG. 3, a line R1 indicates the ratio $(S/D)=2.0\times10^{-3}$, a line R2 the ratio $(S/D)=2.7\times10^{-3}$, a line R3 the ratio $(S/D)=4.0\times10^{-3}$, and a line R4 the ratio $(S/D)=4.7\times10^{-3}$.

Figure 4:
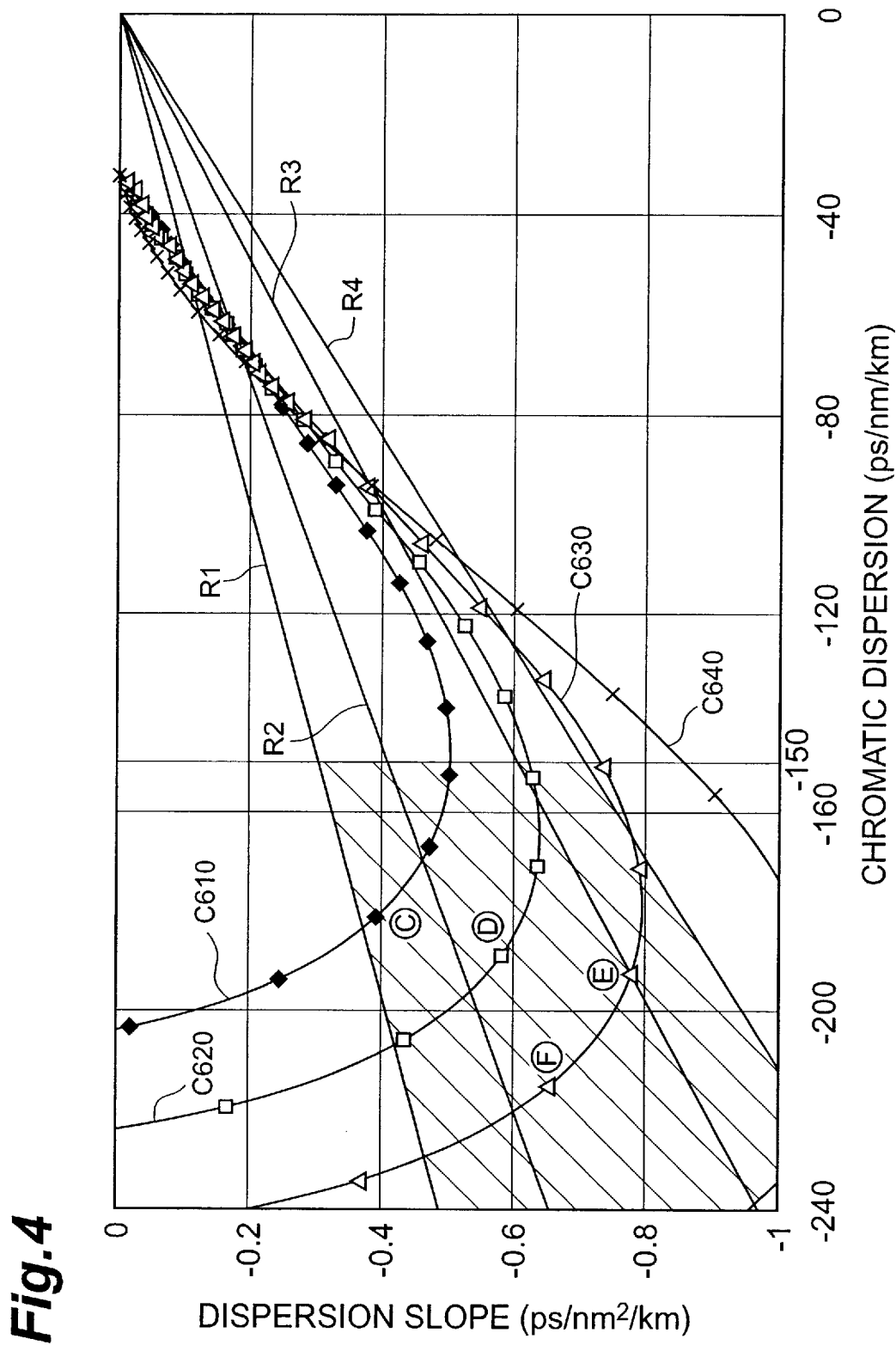

FIG. 4 is also a graph showing the relation between chromatic dispersion and dispersion slope, for each of embodiments of negative-dispersion optical fibers according to the present invention. In each of the embodiments shown in this graph, relative to the third cladding region 223, the relative refractive index difference $\Delta_1$ of the core region 210 is set to 2.7%, the relative refractive index difference $\Delta_2$ of the first cladding region to −0.5%, and the relative refractive index difference $\Delta_3$ of the second cladding region to 0.3%, respectively.

For each of an embodiment of Ra=0.20 and Rb=0.46, an embodiment of Ra=0.20 and Rb=0.50, an embodiment of Ra=0.20 and Rb=0.54, and an embodiment of Ra=0.20 and Rb=0.60, the inventors obtained respective values of the chromatic dispersion $D_2$ and the dispersion slope $S_2$ of each embodiment at the wavelength of 1550 nm with variation in the outside diameter 2c of the second cladding region. In FIG. 4, a curve C610 indicates the relation between chromatic dispersion and dispersion slope of the embodiment of Ra=0.20 and Rb=0.46, a curve C620 that of the embodiment of Ra=0.20 and Rb=0.50, a curve C630 that of the embodiment of Ra=0.20 and Rb=0.54, and a curve C640 that of the embodiment of Ra=0.20 and Rb=0.60. In FIG. 4, the line R1 indicates the ratio $(S/D)=2.0\times10^{-3}$, the line R2 the ratio $(S/D)=2.7\times10^{-3}$, the line R3 the ratio $(S/D)=4.0\times10^{-3}$, and the line R4 the ratio $(S/D)=4.7\times10^{-3}$.

Figure 5:
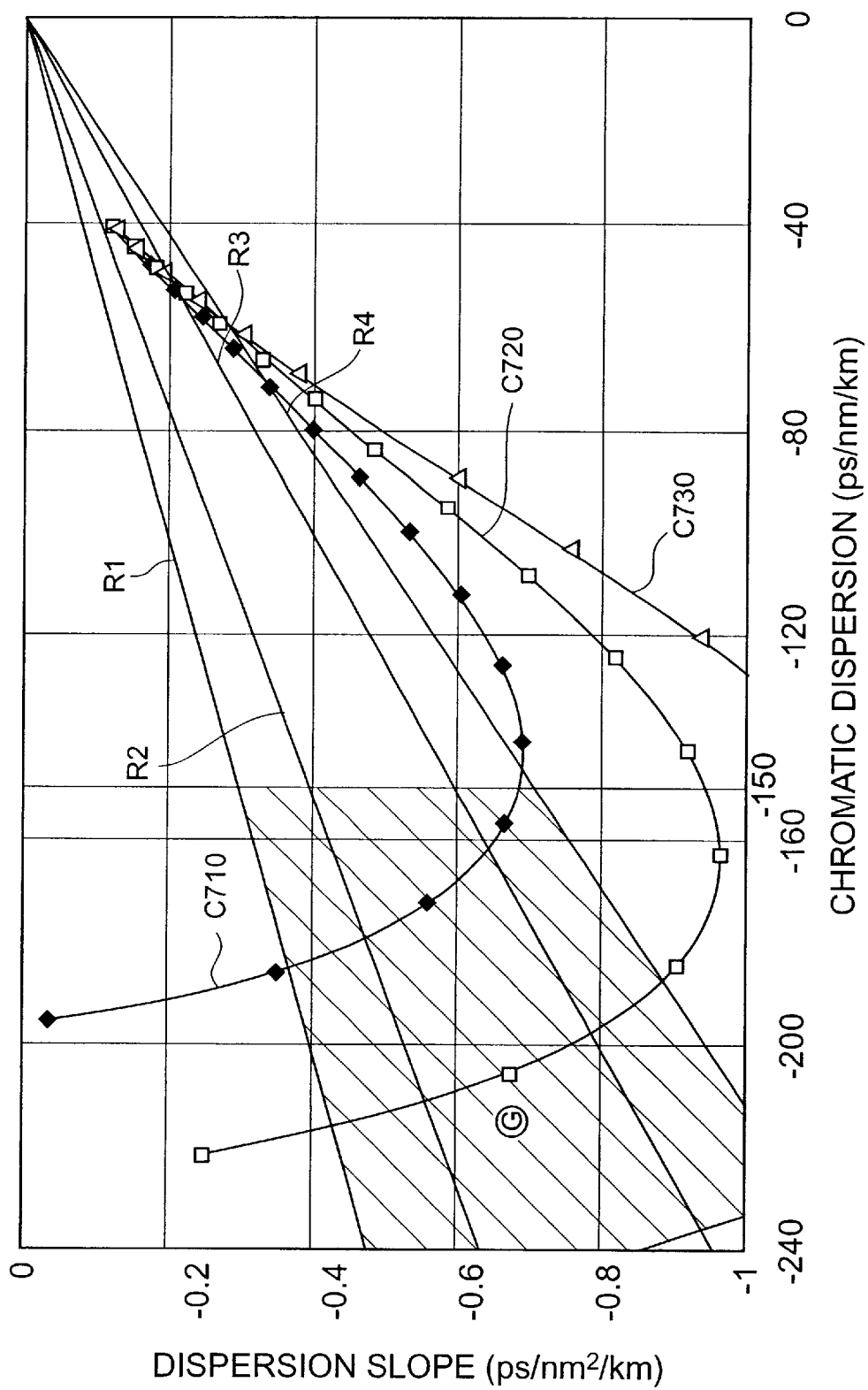

FIG. 5 is a graph showing the relation between chromatic dispersion and dispersion slope, for each of embodiments of negative-dispersion optical fibers according to the present invention. In each of the embodiments shown in this graph, relative to the third cladding region 223, the relative refractive index difference $\Delta_1$ of the core region 210 is set to 2.1%, the relative refractive index difference $\Delta_2$ of the first cladding region to −0.5%, and the relative refractive index difference $\Delta_3$ of the second cladding region to 0.2%, respectively.

For each of an embodiment of Ra=0.20 and Rb=0.46, an embodiment of Ra=0.20 and Rb=0.50, and an embodiment of Ra=0.20 and Rb=0.54, the inventors obtained respective values of the chromatic dispersion $D_2$ and the dispersion slope $S_2$ of each embodiment at the wavelength of 1550 nm with variation in the outside diameter 2c of the second cladding region. In FIG. 5, a curve C710 indicates the relation between chromatic dispersion and dispersion slope of the embodiment of Ra=0.20 and Rb=0.46, a curve C720 that of the embodiment of Ra=0.20 and Rb=0.50, and a curve C730 that of the embodiment of Ra=0.20 and Rb=0.54. In FIG. 5, the line R1 indicates the ratio $(S/D)=2.0\times10^{-3}$, the line R2 the ratio $(S/D)=2.7\times10^{-3}$, the line R3 the ratio $(S/D)=4.0\times10^{-3}$, and the line R4 the ratio $(S/D)=4.7\times10^{-3}$.

In each of these FIG. 3 to FIG. 5 a hatching region indicates a range in which the chromatic dispersion $D_2$ at the wavelength of 1550 nm is not more than −150 ps/nm/km and in which the ratio $(S_2/D_2)$ of the dispersion slope $S_2$ to the chromatic dispersion $D_2$ at the wavelength of 1550 nm is not less than $2.0\times10^{-3}$/nm nor more than $4.7\times10^{-3}$/nm. As seen from these figures, by properly setting values of the respective parameters ($\Delta_1$, $\Delta_2$, $\Delta_3$, Ra, Rb, 2c) in the index profile 250 shown in FIG. 2B, the chromatic dispersion $D_2$ at the wavelength of 1550 nm becomes not more than −150 ps/nm/km, not more than −180 ps/nm/km, and further, even not more than −200 ps/nm/km. The ratio $(S_2/D_2)$ of the dispersion slope $S_2$ to the chromatic dispersion $D_2$ at the wavelength of 1550 nm becomes not less than $2.0\times10^{-3}$/nm nor more than $4.7\times10^{-3}$/nm and even not less than $2.7\times10^{-3}$/nm nor more than $4.0\times10^{-3}$/nm.

FIG. 6 is a table showing the specifications of samples (fibers A to G) corresponding to the embodiments of negative-dispersion optical fibers according to the present invention. The fibers A, B each correspond to the respective embodiments shown in FIG. 3. The fibers C to F each correspond to the respective embodiments shown in FIG. 4. The fiber G corresponds to the embodiment shown in FIG. 5.

In the fiber A, relative to the third cladding region 223, the relative refractive index difference $\Delta_1$ of the core region 210 is set to 2.4%, the relative refractive index difference $\Delta_2$ of the first cladding region 221 to −0.5%, and the relative refractive index difference $\Delta_3$ of the second cladding region 222 to 0.2%. Ra is 0.20, Rb 0.52, and the outside diameter 2c of the second cladding region 222 15.4 µm. The fiber A of this structure has the following properties at the wavelength of 1550 nm: the chromatic dispersion $D_2$ of −200 ps/nm/km; the dispersion slope $S_2$ of −0.69 ps/nm²/km; the ratio $(S_2/D_2)$ of $3.5\times10^{-3}$/nm; the effective area of 17.5 µm²; the bend loss of 4 dB/m in the bend diameter of 20 mm; and the transmission loss of 0.52 dB/km. The cutoff wavelength at the 2m length of the fiber A is 1.22 μm.

In the fiber B, relative to the third cladding region 223, the relative refractive index difference $\Delta_1$ of the core region 210 is set to 2.4%, the relative refractive index difference $\Delta_2$ of the first cladding region 221 to −0.5%, and the relative refractive index difference $\Delta_3$ of the second cladding region 222 to 0.2%. Ra is 0.20, Rb 0.48, and the outside diameter 2c of the second cladding region 222 15.6 μm. The fiber B of this structure has the following properties at the wavelength of 1550 nm: the chromatic dispersion $D_2$ of −185 ps/nm/km; the dispersion slope $S_2$ of −0.43 ps/nm²/km; the ratio $(S_2/D_2)$ of 2.3×10⁻³/nm; the effective area of 17.7 μm²; the bend loss of 1 dB/m in the bend diameter of 20 mm; and the transmission loss of 0.51 dB/km. The cutoff wavelength at the 2m length of the fiber B is 1.30 μm.

In the fiber C, relative to the third cladding region 223, the relative refractive index difference $\Delta_1$ of the core region 210 is set to 2.7%, the relative refractive index difference $\Delta_2$ of the first cladding region 221 to −0.5%, and the relative refractive index difference $\Delta_3$ of the second cladding region 222 to 0.3%. Ra is 0.20, Rb 0.46, and the outside diameter 2c of the second cladding region 222 15.2 μm. The fiber C of this structure has the following properties at the wavelength of 1550 nm: the chromatic dispersion $D_2$ of −182 ps/nm/km; the dispersion slope $S_2$ of −0.39 ps/nm²/km; the ratio $(S_2/D_2)$ of 2.1×10⁻³/nm; the effective area of 14.8 μm²; the bend loss of 0.001 dB/m in the bend diameter of 20 mm; and the transmission loss of 0.65 dB/km. The cutoff wavelength at the 2m length of the fiber C is 1.70 μm.

In the fiber D, relative to the third cladding region 223, the relative refractive index difference $\Delta_1$ of the core region 210 is set to 2.7%, the relative refractive index difference $\Delta_2$ of the first cladding region 221 to −0.5%, and the relative refractive index difference $\Delta_3$ of the second cladding region 222 to 0.3%. Ra is 0.20, Rb 0.50, and the outside diameter 2c of the second cladding region 222 15.0 μm. The fiber D of this structure has the following properties at the wavelength of 1550 nm: the chromatic dispersion $D_2$ of −189 ps/nm/km; the dispersion slope $S_2$ of −0.58 ps/nm²/km; the ratio $(S_2/D_2)$ of 3.1×10⁻³/nm; the effective area of 14.4 μm²; the bend loss of 0.01 dB/m in the bend diameter of 20 mm; and the transmission loss of 0.66 dB/km. The cutoff wavelength at the 2 m length of the fiber D is 1.61 μm.

In the fiber E, relative to the third cladding region 223, the relative refractive index difference $\Delta_1$ of the core region 210 is set to 2.7%, the relative refractive index difference $\Delta_2$ of the first cladding region 221 to −0.5%, and the relative refractive index difference $\Delta_3$ of the second cladding region 222 to 0.3%. Ra is 0.20, Rb 0.54, and the outside diameter 2c of the second cladding region 222 14.8 μm. The fiber E of this structure has the following properties at the wavelength of 1550 nm: the chromatic dispersion $D_2$ of −194 ps/nm/km; the dispersion slope $S_2$ of −0.78 ps/nm²/km; the ratio $(S_2/D_2)$ of 4.0×10⁻³/nm; the effective area of 14.1 μm²; the bend loss of 0.06 dB/m in the bend diameter of 20 mm; and the transmission loss of 0.67 dB/km. The cutoff wavelength at the 2 m length of the fiber E is 1.51 μm.

In the fiber F, relative to the third cladding region 223, the relative refractive index difference $\Delta_1$ of the core region 210 is set to 2.7%, the relative refractive index difference $\Delta_2$ Of the first cladding region 221 to −0.5%, and the relative refractive index difference $\Delta_3$ of the second cladding region 222 to 0.3%. Ra is 0.20, Rb 0.54, and the outside diameter 2c of the second cladding region 222 14.6 μm. The fiber F of this structure has the following properties at the wavelength of 1550 nm: the chromatic dispersion $D_2$ of −216 ps/nm/km; the dispersion slope $S_2$ of −0.65 ps/nm²/km; the ratio $(S_2/D_2)$ of 3.0×10⁻³/nm; the effective area of 15.5 μm²; the bend loss of 0.2 dB/m in the bend diameter of 20 mm; and the transmission loss of 0.67 dB/km. The cutoff wavelength at the 2 m length of the fiber F is 1.49 μm.

In the fiber G, relative to the third cladding region 223, the relative refractive index difference $\Delta_1$ of the core region 210 is set to 2.1%, the relative refractive index difference $\Delta_2$ of the first cladding region 221 to −0.5%, and the relative refractive index difference $\Delta_3$ of the second cladding region 222 to 0.2%. Ra is 0.20, Rb 0.50, and the outside diameter 2c of the second cladding region 222 17.0 μm. The fiber G of this structure has the following properties at the wavelength of 1550 nm: the chromatic dispersion $D_2$ of −206 ps/nm/km; the dispersion slope $S_2$ of −0.68 ps/nm²/km; the ratio $(S_2/D_2)$ of 3.3×10⁻³/nm; the effective area of 21.3 μm²; the bend loss of 9.7 dB/m in the bend diameter of 20 mm; and the transmission loss of 0.49 dB/km. The cutoff wavelength at the 2m length of the fiber G is 1.37 μm.

All the fibers A to G having the above specifications each have the properties at the wavelength of 1550 nm: the chromatic dispersion $D_2$ of not more than −180 ps/nm/km; the ratio $(S_2/D_2)$ of the dispersion slope $S_2$ to the chromatic dispersion $D_2$ of not less than 2.0×10⁻³/nm nor more than 4.7×10⁻³/nm; the effective area of not less than 12 μm² but less than 25 μm²; and the transmission loss of not more than 0.7 dB/km; and have the cutoff wavelength of not less than 1.0 μm nor more than 2.0 μm at the length of 2 m. Especially, each of the fibers A, F has the chromatic dispersion $D_2$ of not more than −200 ps/nm/km. Each of the fibers A, D, E, and F has the ratio $(S_2/D_2)$ of not less than 2.7×10⁻³/nm nor more than 4.0×10⁻³/nm. Each of the fibers D to F, in which the relative refractive index difference $\Delta_3$ of the second cladding region 222 to the third cladding region 223 is 0.3%, has the smaller effective area, the smaller bend loss in the bend diameter of 20 mm, and the longer cutoff wavelength at the length of 2 m than the fibers A, B in which the relative refractive index difference $\Delta_3$ is 0.2%.

Figure 7:
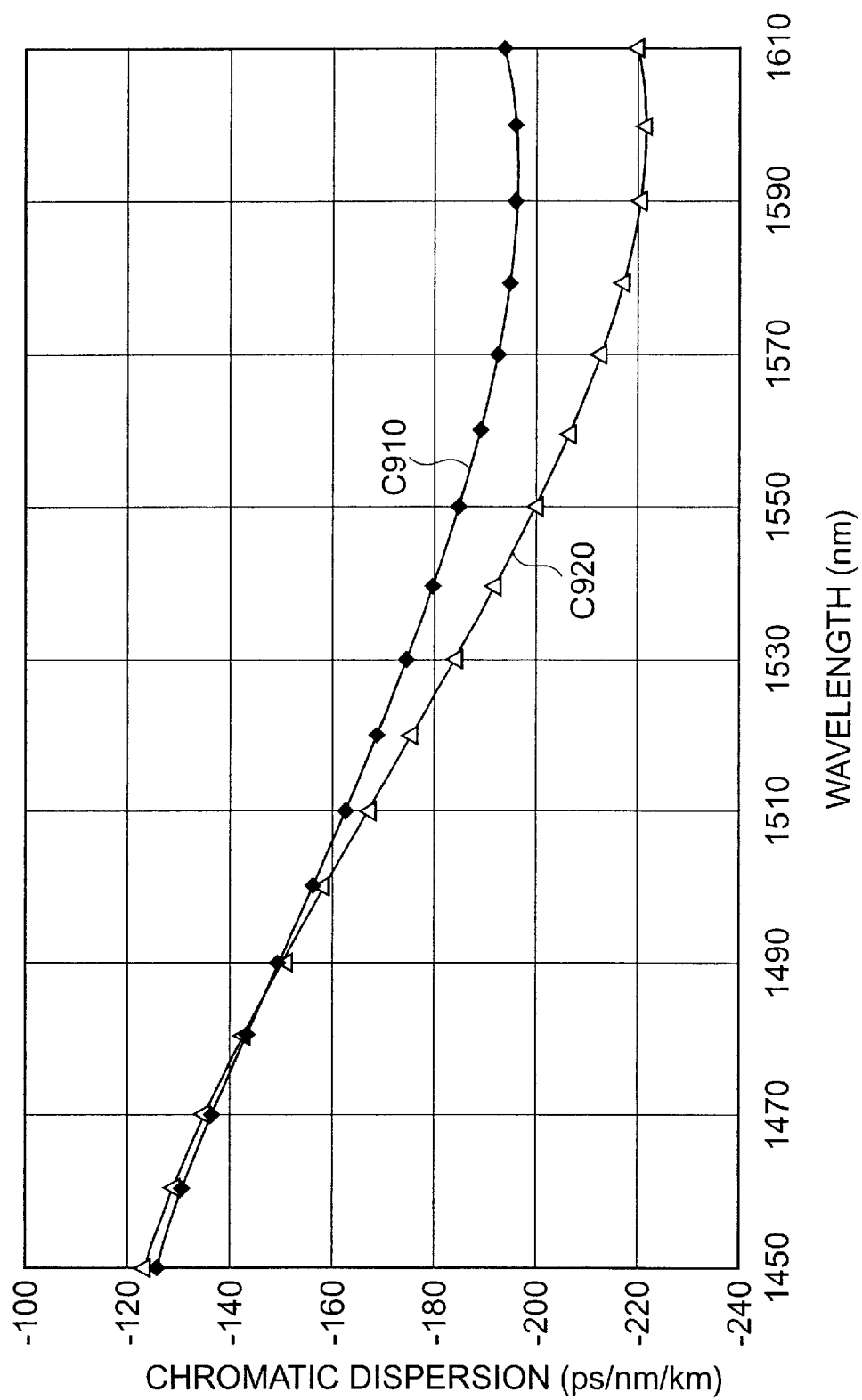
FIG. 7 is a graph showing chromatic dispersion characteristics of respective fibers A and B out of the fibers A to G presented in the table of FIG. 6.
Figure 8:
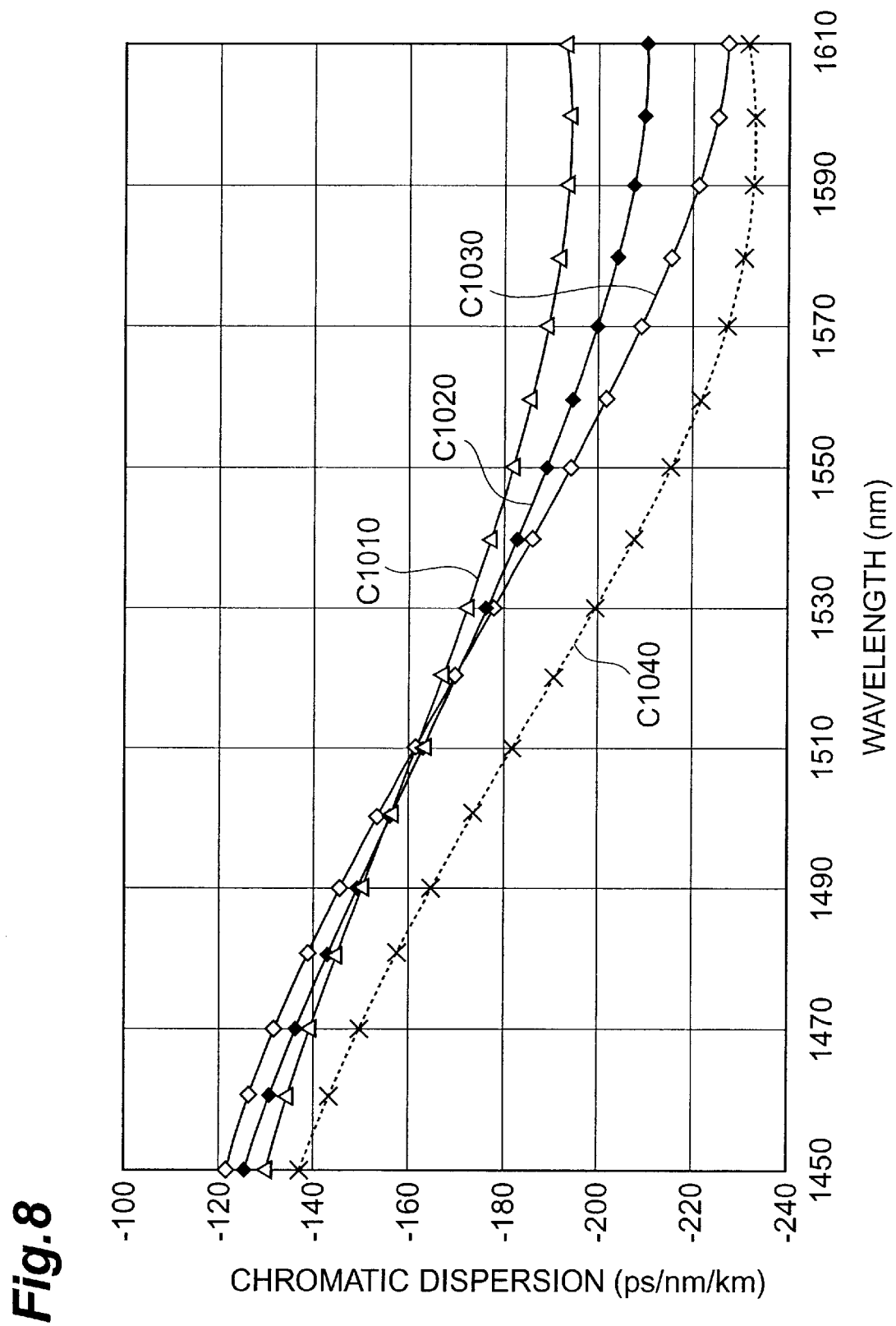
FIG. 8 is a graph showing chromatic dispersion characteristics of respective fibers C to F out of the fibers A to G presented in the table of FIG. 6.
Figure 9:
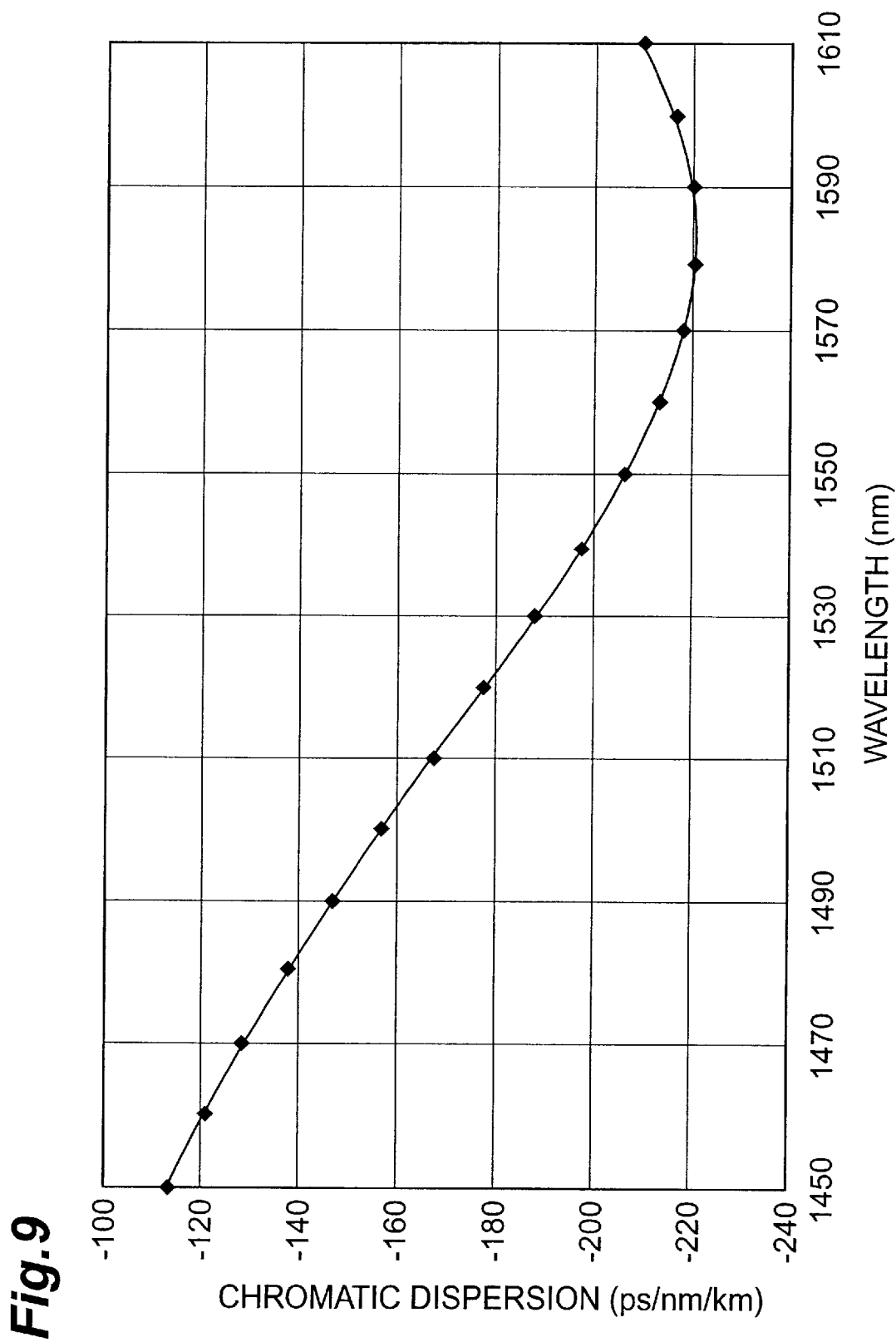
FIG. 9 is a graph showing a chromatic dispersion characteristic of fiber G out of the fibers A to G presented in the table of FIG. 6.

FIG. 7 is a graph showing the chromatic dispersion properties of the respective fibers A, B out of the fibers A to G shown in the table of FIG. 6. FIG. 8 is a graph showing the chromatic dispersion properties of the respective fibers C to F out of those A to G shown in the table of FIG. 6. FIG. 9 is a graph showing the chromatic dispersion property of the fiber G out of those A to G shown in the table of FIG. 6. In FIG. 7, a curve C910 indicates the chromatic dispersion property of the fiber B and a curve C920 the chromatic dispersion property of the fiber A. In FIG. 8, a curve C1010 indicates the chromatic dispersion property of the fiber C, a curve C1020 the chromatic dispersion property of the fiber D, a curve C1030 the chromatic dispersion property of the fiber E, and a curve C1040 the chromatic dispersion property of the fiber F.

Figure 10:
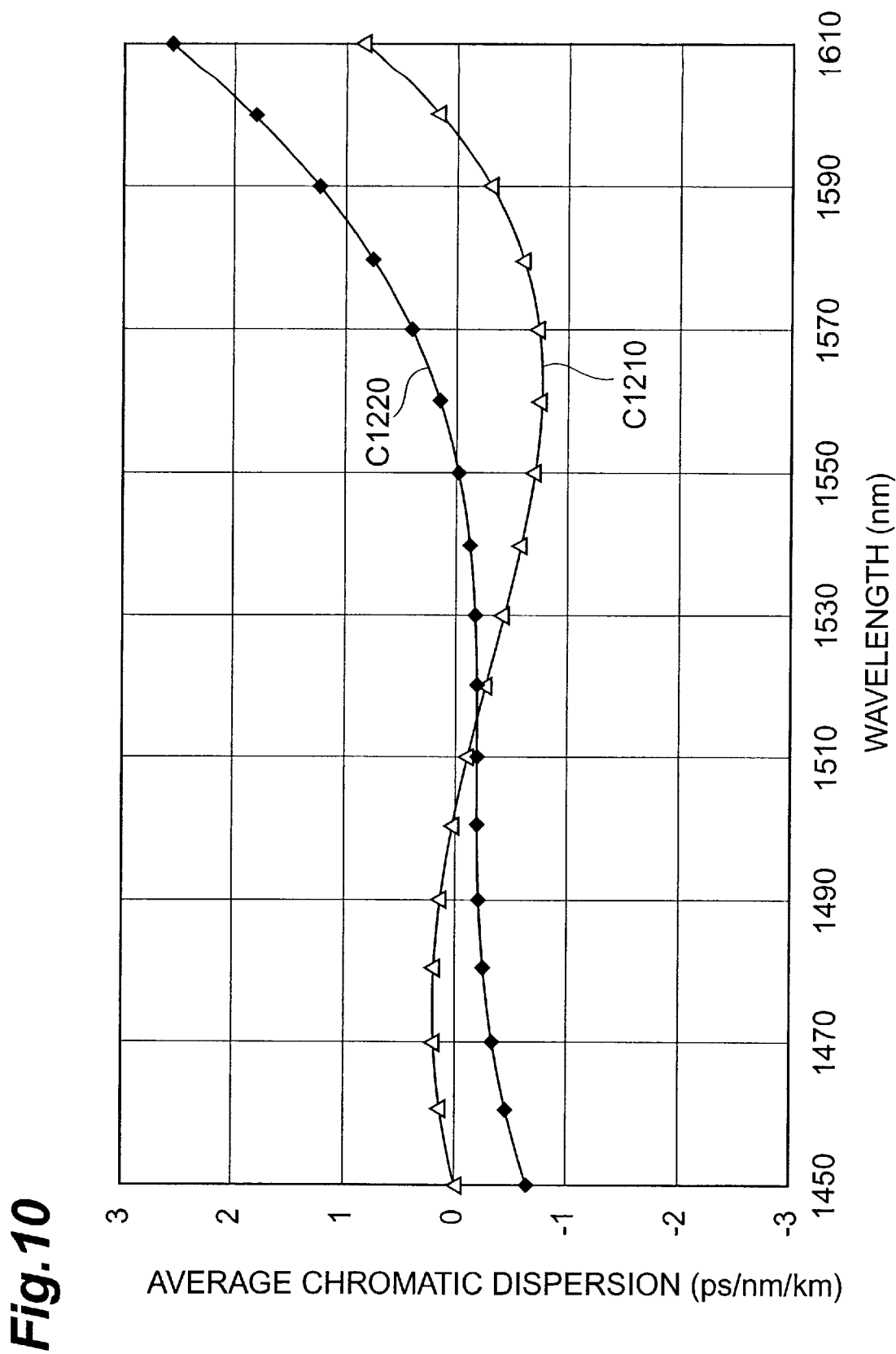
FIG. 10 is a graph showing chromatic dispersion characteristics of respective transmission lines to which the fibers A, B are applied respectively, out of the fibers A to G presented in the table of FIG. 6.
Figure 11:
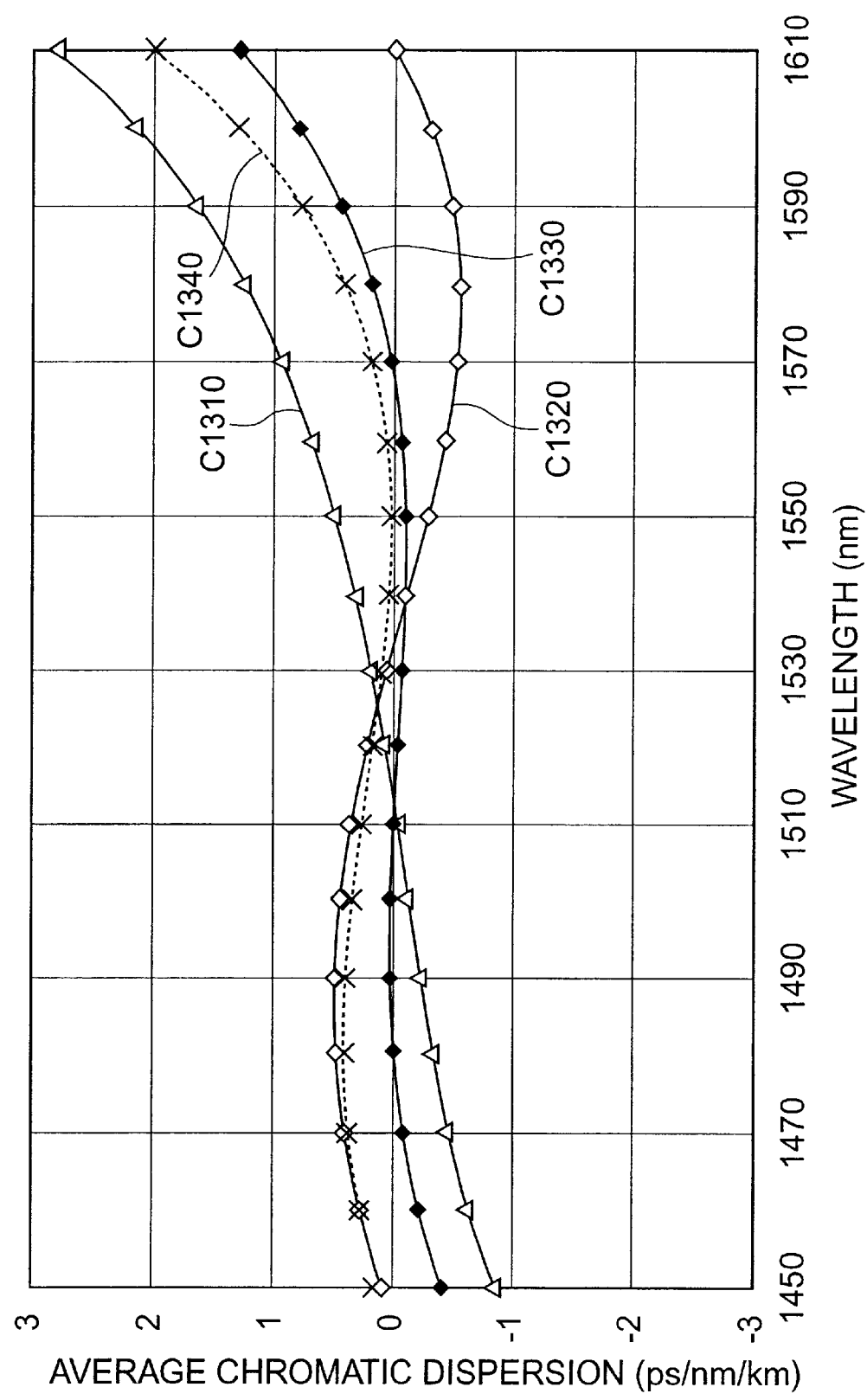
FIG. 11 is a graph showing chromatic dispersion characteristics of respective transmission lines to which the fibers C to F are applied respectively, out of the fibers A to G presented in the table of FIG. 6.
Figure 12:
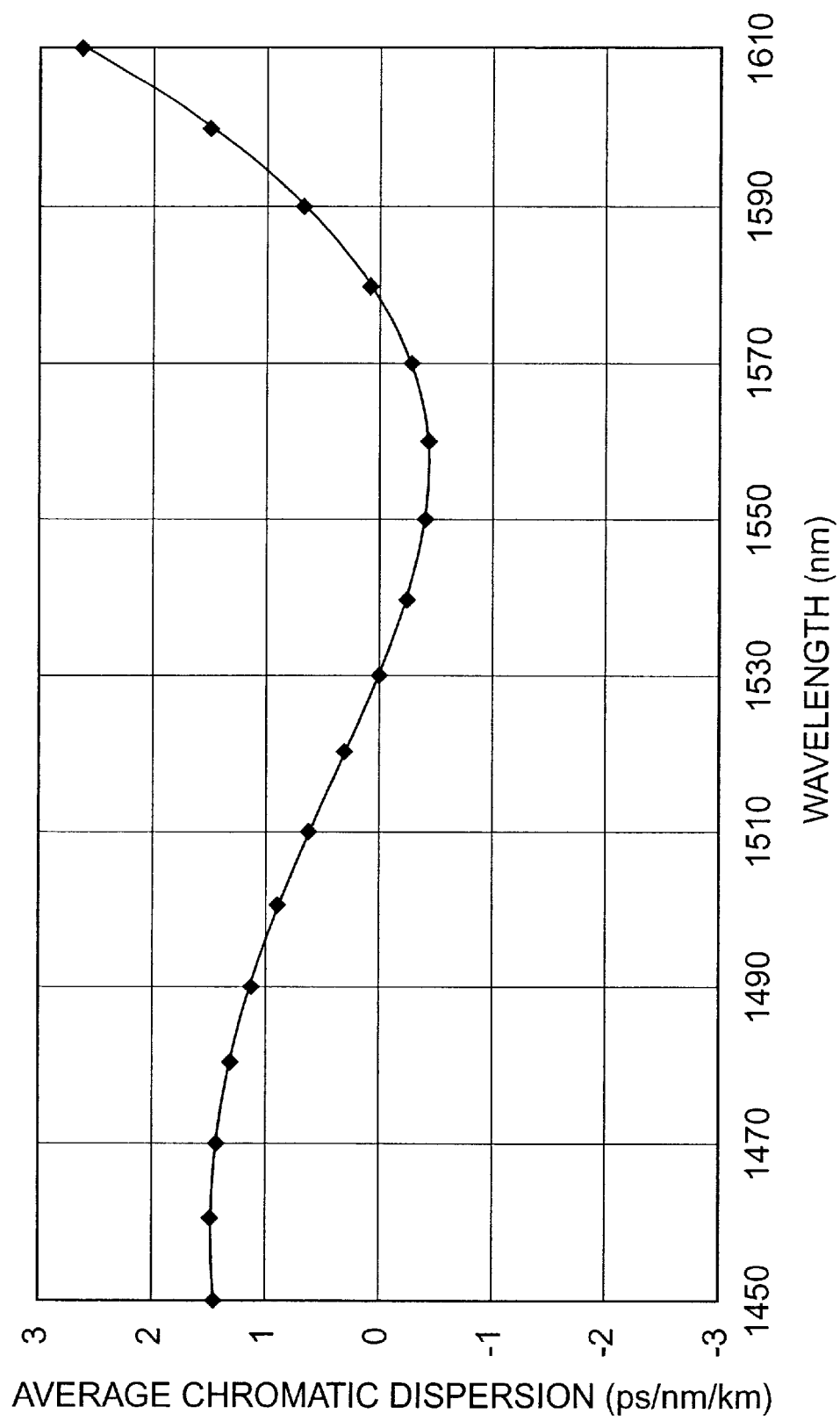
FIG. 12 is a graph showing a chromatic dispersion characteristic of an optical transmission line to which the fiber G is applied, out of the fibers A to G presented in the table of FIG. 6.

Further, FIG. 10 is a graph showing wavelength dispersion properties of respective optical transmission lines to which the fibers A, B are applied respectively, out of the fibers A to G shown in the table of FIG. 6. FIG. 11 is a graph showing chromatic dispersion properties of respective optical transmission lines to which the fibers C to F are applied respectively, out of those A to G shown in the table of FIG. 6. FIG. 12 is a graph showing a chromatic dispersion property of an optical transmission line to which the fiber G is applied, out of those A to G shown in the table of FIG. 6. FIG. 13 is a table presenting the various characteristics of the respective optical transmission lines to which the fibers A to G shown in the table of FIG. 6 are applied. In FIG. 10, a curve 1210 indicates the chromatic dispersion property of the optical transmission line incorporating the fiber A, and a curve 1220 the chromatic dispersion property of the optical transmission line incorporating the fiber B. In FIG. 11, a curve 1310 indicates the chromatic dispersion property of the optical transmission line incorporating the fiber C, a curve 1320 the chromatic dispersion property of the optical transmission line incorporating the fiber E, a curve 1330 the chromatic dispersion property of the optical transmission line incorporating the fiber D, and a curve 1340 the chromatic dispersion property of the optical transmission line incorporating the fiber F.

In each of FIG. 10 to FIG. 13, the positive-dispersion optical fiber as-the other fiber making the optical transmission line is one having the following properties at the wavelength of 1550 nm: the chromatic dispersion of +17 ps/nm/km; and the dispersion slope of +0.057 ps/nm$^2$/km, and having the length of 80 km. The insertion loss in FIG. 13 also includes splice losses due to splicing of conventional, short, positive-dispersion optical fibers to both ends of a module form made from each of the foregoing fibers A to G.

In the optical transmission line incorporating the fiber A, the length of the fiber A is 7.4 km, the insertion loss at the wavelength of 1550 nm is 4.8 dB, the deviation of chromatic dispersion in the wavelength band of 1530 nm to 1560 nm (C-band) is 0.35 ps/nm/km, the deviation of chromatic dispersion in the wavelength band of 1450 nm to 1560 nm (S-band) is 0.94 ps/nm/km, and the deviation of chromatic dispersion in the wavelength band of 1450 nm to 1610 nm (S+C+L band) is 1.62 ps/nm/km.

In the optical transmission line incorporating the fiber B, the length of the fiber B is 7.6 km, the insertion loss at the wavelength of 1550 nm is 4.9 dB, the deviation of chromatic dispersion in the wavelength band of 1530 nm to 1560 nm (C-band) is 0.32 ps/nm/km, the deviation of chromatic dispersion in the wavelength band of 1450 nm to 1560 nm (S-band) is 0.80 ps/nm/km, and the deviation of-chromatic dispersion in the wavelength band of 1450 nm to 1610 nm (S+C+L band) is 3.18 ps/nm/km.

In the optical transmission line incorporating the fiber C, the length of the fiber C is 7.6 km, the insertion loss at the wavelength of 1550 nm is 5.9 dB, the deviation of chromatic dispersion in the wavelength band of 1530 nm to 1560 nm (C-band) is 0.49 ps/nm/km, the deviation of chromatic dispersion in the wavelength band of 1450 nm to 1560 nm (S-band) is 1.51 ps/nm/km, and the deviation of chromatic dispersion in the wavelength band of 1450 nm to 1610 nm (S+C+L band) is 3.64 ps/nm/km.

In the optical transmission line incorporating the fiber D, the length of the fiber D is 7.5 km, the insertion loss at the wavelength of 1550 nm is 6.0 dB, the deviation of chromatic dispersion in the wavelength band of 1530 nm to 1560 nm (C-band) is 0.04 ps/nm/km, the deviation of chromatic dispersion in the wavelength band of 1450 nm to 1560 nm (S-band) is 0.44 ps/nm/km, and the deviation of chromatic dispersion in the wavelength band of 1450 nm to 1610 nm (S+C+L band) is 1.72 ps/nm/km.

In the optical transmission line incorporating the fiber E, the length of the fiber E is 7.4 km, the insertion loss at the wavelength of 1550 nm is 6.0 dB, the deviation of chromatic dispersion in the wavelength band of 1530 nm to 1560 nm (C-band) is 0.48 ps/nm/km, the deviation of chromatic dispersion in the wavelength band of 1450 nm to 1560 nm (S-band) is 0.88 ps/nm/km, and the deviation of chromatic dispersion in the wavelength band of 1450 nm to 1610 nm (S+C+L band) is 1.02 ps/nm/km.

In the optical transmission line incorporating the fiber F, the length of the fiber F is 6.6 km, the insertion loss at the wavelength of 1550 nm is 5.4 dB, the deviation of chromatic dispersion in the wavelength band of 1530 nm to 1560 nm (C-band) is 0.10 ps/nm/km, the deviation of chromatic dispersion in the wavelength band of 1450 nm to 1560 nm (S-band) is 0.41 ps/nm/km, and the deviation of chromatic dispersion in the wavelength band of 1450 nm to 1610 nm (S+C+L band) is 2.10 ps/nm/km.

In the optical transmission line incorporating the fiber G, the length of the fiber G is 7.0 km, the insertion loss at the wavelength of 1550 nm is 4.4 dB, the deviation of chromatic dispersion in the wavelength band of 1530 nm to 1560 nm (C-band) is 0.43 ps/nm/km, the deviation of chromatic dispersion in the wavelength band of 1450 nm to 1560 nm (S-band) is 1.88 ps/nm/km, and the deviation of chromatic dispersion in the wavelength band of 1450 nm to 1610 nm (S+C+L band) is 3.13 ps/nm/km.

The optical transmission lines having the various characteristics as described above (incorporating either of the fibers A to G, respectively) exhibit the following deviations: the deviation of average chromatic dispersion on the whole (variation among wavelengths) in the wavelength band of 1530 nm to 1560 nm is not more than 0.5 ps/nm/km; the deviation of average chromatic dispersion on the whole (variation among wavelengths) in the wavelength band of 1450 nm to 1560 nm is not more than 2.0 ps/nm/km; and the deviation of average chromatic dispersion on the whole (variation among wavelengths) in the wavelength band of 1450 nm to 1610 nm is not more than 4.0 ps/nm/km. In the case of the optical transmission lines incorporating the respective fibers A, D, and E, the deviation of average chromatic dispersion on the whole (variation among wavelengths) in the wavelength band of 1450 nm to 1610 nm is not more than 2.0 ps/nm/km.

Figure 14:
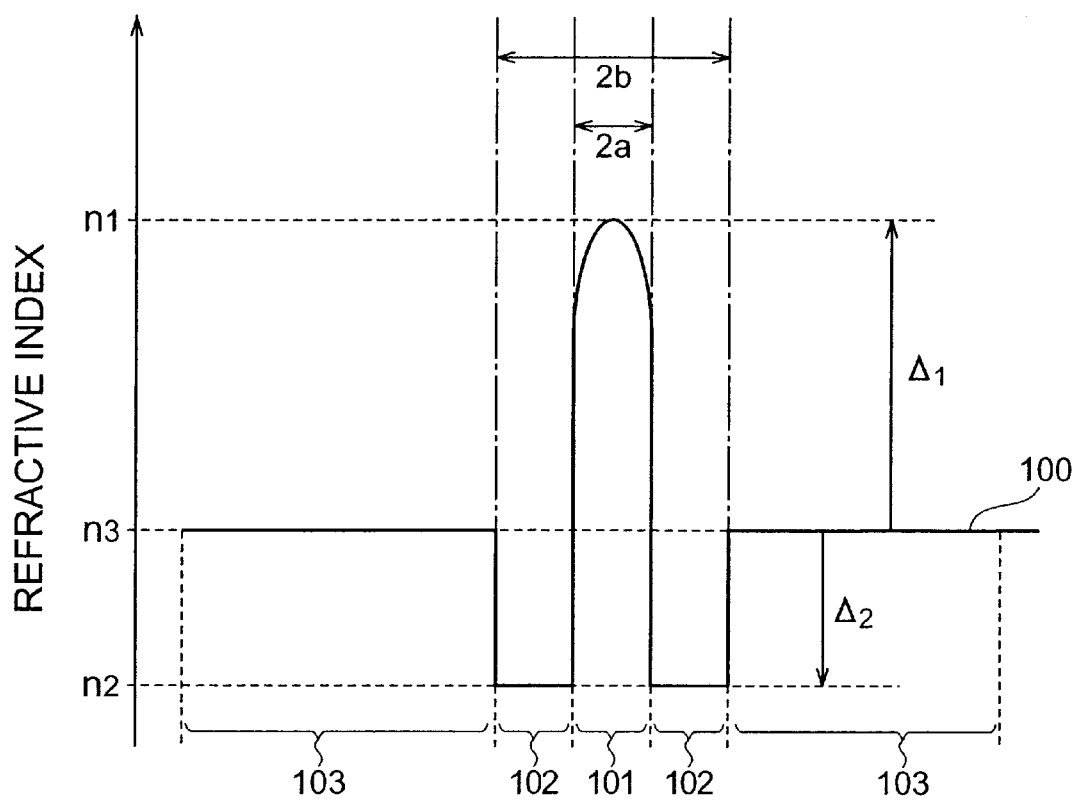
FIG. 14 is an index profile of a negative-dispersion optical fiber prepared as a comparative example.

As a comparative example, FIG. 14 shows an index profile of an ordinary negative-dispersion optical fiber. As also seen from this index profile, the negative-dispersion optical fiber prepared as a comparative example has a core region (a portion corresponding to a region 101 in the index profile 100), a first cladding region (a portion corresponding to a region 102 in the index profile 100), and a second cladding region (a portion corresponding to a region 103 in the index profile 100). The core region has a maximum refractive index $n_1$ and an outside diameter $2a$. The first cladding region has a refractive index $n_2$ ($<n_1$) and an outside diameter $2b$. The second cladding region has a refractive index $n_3$ ($>n_2$ and $<n_1$).

More specifically, the negative-dispersion optical fiber of this comparative example has the outside diameter $2a$ of the core region of 3.2 μm and the outside diameter $2b$ of the first cladding region of 8.1 μm, for example. Relative to the refractive index $n_3$ of the second cladding region, the relative refractive index difference $\Delta_1$ of the core region is 2.1%, and the relative refractive index difference $\Delta_2$ of the first cladding region −0.35%. This negative-dispersion optical fiber has the following properties at the wavelength of 1550 nm: the chromatic dispersion of −88 ps/nm/km; the dispersion slope of −0.19 ps/nm$^2$/km; the effective area of 16.2 μm$^2$; the bend loss of 6 dB/m in the bend diameter of 20 mm; and the transmission loss of 0.39 dB/km. The cutoff wavelength at the length of 2 m (the cutoff wavelength of the $LP_{11}$ mode in a state of a loose turn of a 2 m-long optical fiber in the radius of 140 mm) is 0.74 μm.

On the other hand, the positive-dispersion optical fiber has, for example, the following properties at the wavelength of 1550 nm: the chromatic dispersion of +17 ps/nm/km; and the dispersion slope of +0.057 ps/nm$^2$/km. When the length of this positive-dispersion optical fiber is 80 km, the negative-dispersion optical fiber needs to have the length of 15.9 km, supposing the chromatic dispersion of the positive-dispersion optical fiber is compensated for by the negative-dispersion optical fiber of the comparative example.

Figure 15:
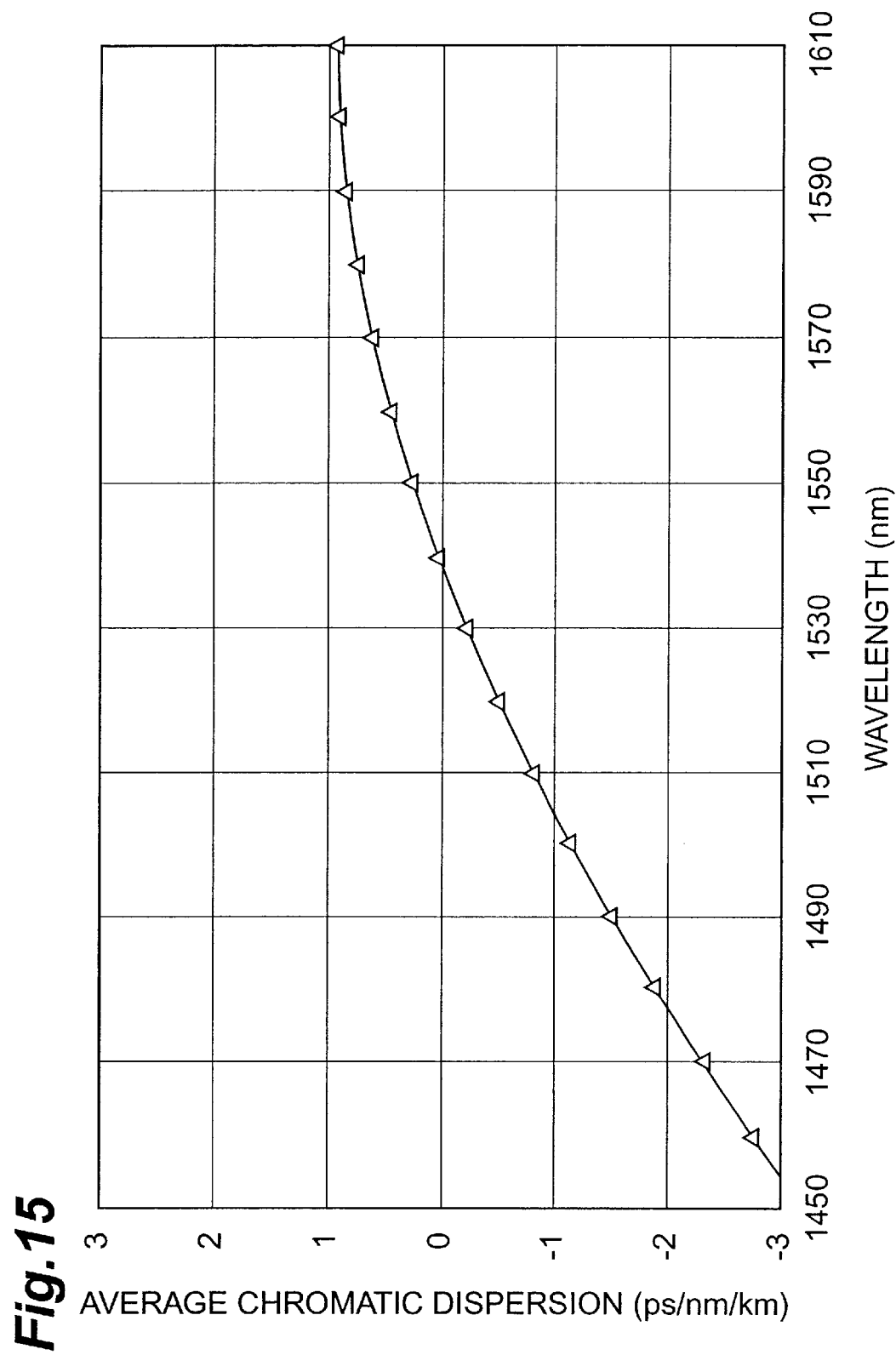
FIG. 15 is a graph showing a chromatic dispersion characteristic of an entire transmission line composed of the negative-dispersion optical fiber shown in FIG. 14 and a positive-dispersion optical fiber.

FIG. 15 is a graph showing an average chromatic dispersion property on the whole of the optical transmission line composed of the positive-dispersion optical fiber and the negative-dispersion optical fiber (comparative example) as described above. As shown in this FIG. 15, though the average chromatic dispersion is 0 at the wavelength of 1540 nm, absolute values of average chromatic dispersion increase with deviation from this wavelength. Accordingly, the deviation (maximum–minimum) of average chromatic dispersion among wavelengths in the wavelength band of 1530 nm to 1560 nm is 0.68 ps/nm/km, the deviation of average chromatic dispersion among wavelengths in the wavelength band of 1450 nm to 1560 nm 3.70 ps/nm/km, and the deviation of average chromatic dispersion among wavelengths in the wavelength band of 1450 nm to 1610 nm 4.18 ps/nm/km. Since the deviations among wavelengths in the signal wavelength bands are large as described above, the optical transmission line incorporating such a negative-dispersion optical fiber as the comparative example has a limit to implementation of long-haul and large-capacity WDM optical transmission.

As described above, the present invention can decrease the ratio of the length of the negative-dispersion optical fiber in the optical transmission line incorporating the negative-dispersion optical fiber with small chromatic dispersion D (i.e., chromatic dispersion with the negative sign and large absolute value) and the positive-dispersion optical fiber. This can decrease the average transmission loss of the optical transmission line and enables fabrication at low cost. Since the ratio (S/D) of the dispersion slope S to the chromatic dispersion D of the negative-dispersion optical fiber is not less than $2.0 \times 10^{-3}$/nm nor more than $4.7 \times 10^{-3}$/nm, the dispersion slope compensation rate becomes approximately 60% to 140% and this can decrease both the absolute values of the respective average chromatic dispersion and average dispersion slope on the whole of the optical transmission line and decrease the deviation (maximum–minimum) of average chromatic dispersion among wavelengths on the whole of the optical transmission line in the signal wavelength band. The effective area of not less than 12 $\mu m^2$ is equivalent to or greater than those of the ordinary negative-dispersion optical fibers and can effectively suppress occurrence of the nonlinear optical phenomena in the negative-dispersion optical fiber. Further, when the effective area is less than 25 $\mu m^2$ and preferably less than 20 $\mu m^2$, the loss is small in the negative-dispersion optical fiber even in the cable form as a bundle of optical fibers having the structure similar to that of the negative-dispersion optical fiber or in the module form wound in coil shape.

In addition, since the chromatic dispersion and dispersion slope both are compensated in the optical transmission line according to the present invention, the absolute values of chromatic dispersion can be kept small throughout the entire signal wavelength band and it becomes feasible to implement the long-haul and large-capacity WDM optical transmission.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A negative-dispersion optical fiber having the following properties at the wavelength of 1550 nm:
    a chromatic dispersion D of not more than –150 ps/nm/km;
    a dispersion slope S satisfying such a condition that a ratio (S/D) thereof to the chromatic dispersion D is not less than $2.0 \times 10^{-3}$/nm nor more than $4.7 \times 10^{-3}$/nm; and
    an effective area of not less than 12 $\mu m^2$ but less than 25 $\mu m^2$.

2. A negative-dispersion optical fiber according to claim 1, wherein said chromatic dispersion D is not more than –180 ps/nm/km.

3. A negative-dispersion optical fiber according to claim 1, wherein said effective area is less than 20 $\mu m^2$.

4. A negative-dispersion optical fiber according to claim 1, wherein said ratio (S/D) is not less than $2.7 \times 10^{-3}$/nm nor more than $4.0 \times 10^{-3}$/nm.

5. A negative-dispersion optical fiber according to claim 1, further having a cutoff wavelength of not less than 1.0 $\mu m$ nor more than 2.0 $\mu m$ at a length of 2 m.

6. A negative-dispersion optical fiber according to claim 1, further having a transmission loss of not more than 1.0 dB/km for light having the wavelength of 1550 nm.

7. A negative-dispersion optical fiber according to claim 6, wherein said transmission loss is not more than 0.7 dB/km.

8. A negative-dispersion optical fiber according to claim 1, which comprises:
    a core region extending along a predetermined axis and having a predetermined maximum refractive index;
    a first cladding region provided on the outer periphery of said center core region and having a refractive index lower than the maximum refractive index of the core region;
    a second cladding region provided on the outer periphery of said first cladding region and having a refractive index higher than the refractive index of the first cladding region; and
    a third cladding region provided on the outer periphery of said second cladding region and having a refractive index lower than the refractive index of the second cladding region.

9. A negative-dispersion-optical fiber according to claim 8, wherein a maximum relative refractive index difference of said core region to said third cladding region is not less than 1.8% nor more than 3.0%.

10. An optical transmission line comprising:
    a positive-dispersion optical fiber having the following properties at the wavelength of 1550 nm: chromatic dispersion of not less than +15 ps/nm/km nor more than +21 ps/nm/km; and a dispersion slope of not less than +0.05 ps/nm²/km nor more than +0.07 ps/nm²/km; and
    said negative-dispersion optical fiber according to claim 1.

11. An optical transmission line according to claim 10, wherein in a wavelength band of 1530 nm to 1560 nm, a deviation of average chromatic dispersion among wavelengths on the whole of the optical transmission line is not more than 0.5 ps/nm/km.

12. An optical transmission line according to claim 10, wherein in a wavelength band of 1450 nm to 1560 nm, a deviation of average chromatic dispersion among wavelengths on the whole of the optical transmission line is not more than 2.0 ps/nm/km.

13. An optical transmission line according to claim 10, wherein in a wavelength band of 1450 nm to 1610 nm, a deviation of average chromatic dispersion among wavelengths on the whole of the optical transmission line is not more than 4.0 ps/nm/km.

14. An optical transmission line according to claim 13, wherein in a wavelength band of 1450 nm to 1610 nm, the deviation of average chromatic dispersion among wavelengths on the whole of the optical transmission line is not more than 2.0 ps/nm/km.

15. A negative-dispersion optical fiber having the following properties at the wavelength of 1550 nm:
   a chromatic dispersion D of not more than −200 ps/nm/km; and
   a dispersion slope S satisfying such a condition that a ratio (S/D) thereof to said chromatic dispersion D is not less than $2.0 \times 10^{-3}$/nm nor more than $4.7 \times 10^{-3}$/nm.

16. A negative-dispersion optical fiber according to claim 15, wherein said ratio (S/D) is not less than $2.7 \times 10^{-3}$/nm nor more than $4.0 \times 10^{-3}$/nm.

17. A negative-dispersion optical fiber according to claim 15, further having a cutoff wavelength of not less than 1.0 μm nor more than 2.0 μm at a length of 2 m.

18. A negative-dispersion optical fiber according to claim 15, further having a transmission loss of not more than 1.0 dB/km for light having the wavelength of 1550 nm.

19. A negative-dispersion optical fiber according to claim 18, wherein said transmission loss is not more than 0.7 dB/km.

20. A negative-dispersion optical fiber according to claim 15, which comprises:
   a core region extending along a predetermined axis and having a predetermined maximum refractive index;
   a first cladding region provided on the outer periphery of said core region and having a refractive index lower than the maximum refractive index of the core region;
   a second cladding region provided on the outer periphery of said first cladding region and having a refractive index higher than the refractive index of the first cladding region; and
   a third cladding region provided on the outer periphery of said second cladding region and having a refractive index lower than the refractive index of the second cladding region.

21. A negative-dispersion optical fiber according to claim 20, wherein a maximum relative refractive index difference of said core region to said third cladding region is not less than 1.8% nor more than 3.0%.

22. An optical transmission line comprising:
   a positive-dispersion optical fiber having the following properties at the wavelength of 1550 nm: chromatic dispersion of not less than +15 ps/nm/km nor more than +21 ps/nm/km; and a dispersion slope of not less than +0.05 ps/nm²/km nor more than +0.07 ps/nm²/km; and
   said negative-dispersion optical fiber according to claim 15.

23. An optical transmission line according to claim 22, wherein in a wavelength band of 1530 nm to 1560 nm, a deviation of average chromatic dispersion among wavelengths on the whole of the optical transmission line is not more than 0.5 ps/nm/km.

24. An optical transmission line according to claim 22, wherein in a wavelength band of 1450 nm to 1560 nm, a deviation of average chromatic dispersion among wavelengths on the whole of the optical transmission line is not more than 2.0 ps/nm/km.

25. An optical transmission line according to claim 22, wherein in a wavelength band of 1450 nm to 1610 nm, a deviation of average chromatic dispersion among wavelengths on the whole of the optical transmission line is not more than 4.0 ps/nm/km.

26. An optical transmission line according to claim 25, wherein in a wavelength band of 1450 nm to 1610 nm, the deviation of average chromatic dispersion among wavelengths on the whole of the optical transmission line is not more than 2.0 ps/nm/km.

* * * * *